US006807493B2

(12) United States Patent
Srinivasan

(10) Patent No.: US 6,807,493 B2
(45) Date of Patent: Oct. 19, 2004

(54) ESTIMATING FLOW RATES IN OPEN-CHANNEL GEOMETRIES HAVING CAPILLARY PUMPING VANES

(75) Inventor: Radhakrishnan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 09/864,522

(22) Filed: May 24, 2001

(65) Prior Publication Data

US 2003/0055579 A1 Mar. 20, 2003

(51) Int. Cl.[7] .............................. G01F 1/00; G01F 7/00; G06F 19/00
(52) U.S. Cl. ....................................................... 702/45
(58) Field of Search ........................... 702/45, 47, 142; 166/265

(56) References Cited

U.S. PATENT DOCUMENTS

| 4,248,085 | A | * | 2/1981 | Coulthard .................... 702/142 |
| 4,334,854 | A | * | 6/1982 | Graat et al. .................... 431/8 |
| 4,553,565 | A | | 11/1985 | Kerebel |
| 4,727,489 | A | * | 2/1988 | Frazier et al. ............... 166/265 |
| 4,733,531 | A | | 3/1988 | Grove |
| 4,743,278 | A | | 5/1988 | Yeh |
| 5,293,895 | A | | 3/1994 | Grove et al. |
| 6,332,111 | B1 | * | 12/2001 | Fincke .......................... 702/45 |
| 2002/0016688 | A1 | * | 2/2002 | Fincke .......................... 702/45 |
| 2002/0068674 | A1 | * | 6/2002 | Hlavinka et al. .............. 494/37 |
| 2002/0069022 | A1 | * | 6/2002 | Fincke .......................... 702/47 |
| 2002/0192531 | A1 | * | 12/2002 | Zimmerman et al. ......... 429/38 |

FOREIGN PATENT DOCUMENTS

| JP | 404032722 | * | 2/1992 | ......... G01F/15/075 |

OTHER PUBLICATIONS

Dale A. Fester et al., "Surface Tension Propellant Acquisition System Technology for Space Shuttle Reaction Control Tanks," J. Spacecraft, vol. 13, No. 9, pp. 522–527 (1976).

A. Kerebel et al., "Development of a Telecommunication Spacecraft Propellant Tank," AIAA–86–1502.

D. Baralle et al., "Propellant Tank for Telecommunication Platforms," AIAA–89–2761.

P. N. Shankar, "The Eddy Structure in Stokes Flow in a Cavity," J. Fluid Mech. (1993), vol. 250, pp. 371–383, Cambridge University Press, UK.

P. N. Shankar, "Three–Dimensional Eddy Structure in a Cylindrical Container," J. Fluid Mech. (1997), vol. 342, pp. 97–118, Cambridge University Press, UK.

G. E. Forsythe et al., Computer Methods for Mathematical Computations (Prentice–Hall, New Jersey, USA, 1977), Chap. 3, pp. 41–55.

* cited by examiner

Primary Examiner—John Barlow
Assistant Examiner—Aditya Bhat
(74) Attorney, Agent, or Firm—T. Rao Coca; Anthony V. S England

(57) ABSTRACT

A method of estimating liquid flow rates in capillary structures has application in determining the surface tension-driven flow rates of liquid fuel in propellant management devices in zero-gravity conditions. Analytic equations governing an assumed open-channel geometry are simplified by reasonable approximations, which allow a modified set of analytic equations to be derived. This modified set of analytic equations is derived by assuming an artificial taper in the capillary passage. Flow rate can be determined from the modified set of equations, which closely approximates the flow rate in the open-channel geometry.

32 Claims, 7 Drawing Sheets

ESTIMATING FLOW RATES IN OPEN-CHANNEL GEOMETRIES HAVING CAPILLARY PUMPING VANES

FIELD OF THE INVENTION

The invention relates to estimating liquid flow rates in open-channel geometries and relates particularly, though not exclusively, to an improved method of effectively estimating liquid fuel flow rates and other parameters associated with the flow of liquid fuel through vane-type propellant management devices under zero-gravity conditions, that is, in fuel delivery systems used by space equipment.

BACKGROUND OF THE INVENTION

In vane-type surface tension propellant management devices (PMD) commonly used in satellite fuel tanks, the propellant is transported along guiding vanes from a reservoir at the inlet of the device to a sump at the outlet from where the fuel is pumped to the satellite engine. The pressure gradient driving this free-surface flow under zero-gravity (zero-g) conditions is generated by surface tension and is related to the differential curvatures of the propellant-gas interface at the inlet and outlet of the PMD.

Constructional details of exemplary designs and systems can be found in the existing patent literature. In this respect, by way of example only, U.S. Pat. Nos. 4,733,531, 5,293,895, 4,553,565 and 4,743,278 disclose typical constructions.

In a real-life situation, after one set of satellite orbiting manoeuvres are completed, the designer/operator would like to know for how long one has to wait before the sump gets refilled, so that the next set of manoeuvres may be performed. Given the complexity of the governing equations in this free-surface flow problem, the only possible options are to generate the required data for the drainage times either experimentally or via numerical simulation. If one decides to proceed experimentally, the options are to either perform the experiment in space (which would obviously be expensive) or on the ground, where one would be faced with the cost and difficulties of setting up a zero-g environment.

Experimental approaches involve obvious difficulties and limitations, a notable one of which is expense. An overview of some of the other issues involved in using experimental techniques are discussed (in the context of space shuttle fuel tanks) in Dale A. Fester, Ashton J. Villars, and Preston E. Uney, Surface tension propellant acquisition system technology for space shuttle reaction control tanks. J. Spacecraft 9, 522 (1976).

The second option, of using computer simulation, presents equally difficult challenges. One computes an unsteady, three-dimensional free-surface flow in a complex geometry. Further, the flow rates involved in a zero-g environment are extremely small; typically, the drainage time for 2 litres of propellant could be anywhere from 8 to 24 hours. These flow rates are several orders of magnitude less than those in a 1-g environment.

Computing these zero-g flows by a brute-force unsteady 3-D simulation would not only be prohibitively expensive, but the issues of convergence and accuracy would be difficult to settle because of the extremely small flow rates involved. If one attempts to take care of the complexity of the geometry by ignoring the entry and exit regions, then the problem would be to accurately estimate the entry and exit conditions in a straight section of the vane.

To the inventor's knowledge there do not currently exist any published numerical simulation results for a zero-g PMD. Estimates of drainage times, presumably obtained experimentally, are available in several references, typically papers of the American Institute of Aeronautics and Astronautics, such as: (a) A. Kerebel and D. Baralle, A low-cost surface tension tank optimised for telecommunication satellites. AIAA-85-1131; (b) A. Kerebel and P. Durgat, Development of a telecommunications spacecraft propellant tank. AIAA-86-1502; or (c) D. Baralle and J. P. Fournier, Propellant tank for telecommunication platforms. AIAA-89-2761.

Owing to the substantial cost and the technical hurdles involved in accurately estimating these minuscule flow rates by either direct numerical simulation or by experimental methods which simulate zero-g conditions in the lab, any solution which offers advantages of any kind over existing techniques would provide benefits to those working in the field, particularly in relation to the design and general operation of satellite fuel tanks.

In view of the above, a need clearly exists for an improved method of calculating flow rates in PMD devices that at least attempts to address one or more of the limitations of existing techniques.

SUMMARY OF THE INVENTION

The aspects of the invention involve a recognition that an accurate and computationally tractable solution to the problem of calculating the fuel flow rates in a zero-g PMD can be achieved by using a semi-analytical procedure under certain reasonably idealized conditions. As the inventive technique uses exact analytical solutions (via eigenfunction expansions) of a suitably perturbed version of the Stokes flow equations, the issue of convergence is confined to the accuracy with which boundary data are satisfied. Further, due to relatively conservative computational and memory requirements, the effect of varying parameters (such as, for example, aspect ratio and contact angle) can be more readily investigated.

Accordingly, a first aspect of the invention provides a method of estimating the flow rate of a liquid through an open-channel geometry, the method comprising steps of:

defining (i) an open-channel geometry having an inlet end and an outlet end, between which there is a capillary passage having two parallel walls, (ii) a set of parameters associated with the open-channel geometry, and (iii) analytical equations involving the set of parameters which govern the flow of liquid through the open-channel geometry; and deriving a modified set of analytic equations corresponding to the governing analytic equations of the open-channel geometry, and solving said modified set of analytic equations to calculate a representative flow rate defined by the modified set of equations;

wherein said modified set of equations are derived from a modified open-channel geometry based on an artificial assumption that an elongate dimension of the open-channel geometry is tapered, so that the representative flow rate can be calculated as an approximation of the flow rate in the open-channel geometry.

In the modified set of equations, the taper of the channel geometry is assumed to be linear in the height of the open-channel geometry. The representative flow rate is calculated on the assumption that the flow rate is independent of the geometries of the inlet and outlet ends. Further, time derivatives are assumed to be negligible so that the flow rate is directly related to the instantaneous pressure gradient between the inlet end and the outlet end.

The artificial assumption of a tapered channel height obviates the need to take into account the calculation of wall layers in the open-channel geometry for the analytic governing equations, so that the free surface of the liquid has approximately a constant radius of curvature which is able to satisfy requirements of a defined contact angle between the liquid and the open-channel geometry.

The calculated meniscus radii of curvature of the liquid at the inlet and outlet ends of the open-channel geometry is assumed to be independent of the inlet or outlet end geometry, in the modified set of equations. The instantaneous pressure difference along the open-channel geometry is determined from the Laplace-Young equation and from the respective inlet and outlet meniscus radii and the surface tension coefficient of the liquid.

A parameter $\delta$ defines a linear taper in average channel height H, such that the inlet and outlet heights $H_i$ and $H_o$ are given by:

$$H_i = \frac{2H}{1+\delta}, \quad H_o = \frac{2\delta H}{1+\delta} = \delta H_i.$$

In the modified equations, the pressure difference for the open-channel geometry is equated with the pressure difference for the modified open-channel geometry to determine the parameter $\delta$.

The modified set of equations are preferably solved with a finite difference scheme using a weighted least-squares algorithm.

The parallel walls of the open-channel geometry represent the fuel tank wall and a vane in a propellant management device, with the other two sides being open.

The invention also provides a computer program product having a computer readable medium having a computer program recorded therein for estimating the flow rate of a liquid through an open-channel geometry, said computer program comprising:

means for recording a definition of (i) an open-channel geometry having an inlet end and an outlet end, between which there is a capillary passage having two parallel walls, (ii) a set of parameters associated with the open-channel geometry, and (iii) analytical equations involving the set of parameters which govern the flow of liquid through the open-channel geometry; and means for storing a modified set of analytic equations corresponding to the governing analytic equations of the open-channel geometry, and solving said modified set of analytic equations to calculate a representative flow rate defined by the modified set of equations;

wherein said modified set of equations are derived from a modified open-channel geometry based on an artificial assumption that an elongate dimension of the open-channel geometry is tapered, so that the representative flow rate can be calculated as an approximation of the flow rate in the open-channel geometry.

The computer program is suitable for execution on existing general-purpose computing hardware.

DETAILED DESCRIPTION OF EMBODIMENTS AND BEST MODE

An embodiment of the invention is described in relation to the calculation of fuel flow rates in a PMD device as described below in further detail.

Idealized Geometry

Figure 1A:
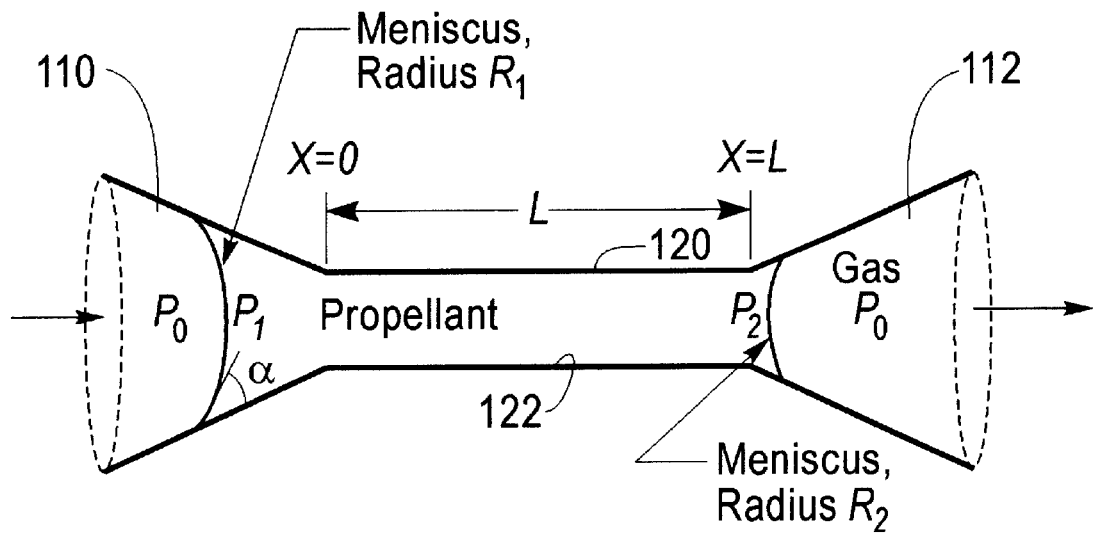
FIGS. 1A and 1B are side and end views of a schematic representation of a flow geometry and coordinate system used in conjunction with an embodiment of the invention.
Figure 1B:
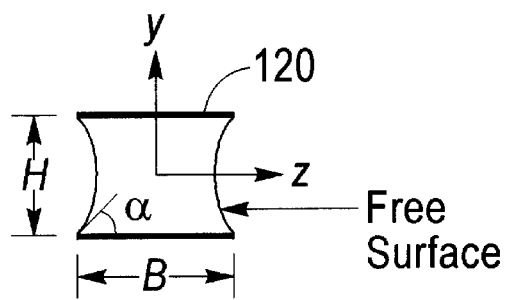

The salient features of a PMD device are illustrated in the idealized geometry shown in FIGS. 1A and 1B, where all quantities in upper case are dimensional (length L, height H and width B). Here the reservoir 110 and the sump 112 are taken as identical conical sections and the vane 120 and fuel tank wall 122 are assumed to be straight in the flow direction X. In actual practice the fuel tank would be typically spherical or elongate and the inlet and outlet compartment geometries more complex.

Under zero gravity (zero-g) conditions, the pressure gradient driving the flow in the positive X direction is generated by surface tension and is related to the difference in the curvatures of the gas-propellant interfaces at the reservoir 110 and the sump 112 respectively.

In FIGS. 1A and 1B, the pressure jumps discontinuously from the ambient $P_0$ to the fluid pressure $P_1$ across the inlet interface and from $P_0$ to $P_2$ across that at the outlet; these discontinuities are determined by the well-known Laplace-Young equation. The pressure differential driving the flow is then given by the pressure difference $P_1-P_2$.

In the situation shown in FIGS. 1A and 1B, the contact angle $\alpha$ satisfy $0 \leq \alpha < \pi/2$, corresponding to a wetting fluid (which is the case for most propellants) and $P_1-P_2$ would thus be positive provided the radius of curvature of the inlet interface exceeds that of the outlet.

The geometry of FIGS. 1A and 1B are an idealized version in the sense that (a) the vane is assumed to be straight in the flow direction (X) and (b) the inlet and exit compartments are simplified to be conical sections. The latter assumption is not essential for the described analysis and is made only for convenience. In conical sections, the meniscus curvature for a given volume of contained fuel and the rate of change of this curvature for a given drainage/accumulation rate of the contained fuel are both easily calculated analytically, while in a more complicated geometry these quantities would have to be obtained by numerical quadrature/differentiation.

Neglect of the vane curvature is justified as follows. In practice, the fuel tank wall 122 may be spherical and the vanes guide the fuel along this wall from the inlet to the outlet compartments. The ratio of the radius of curvature of the tank wall 122 to the height of the channel cross section that is, (H in FIG. 1B) is usually large, of the order of several hundreds. Secondly, because of the extremely small flow rates involved, it is expected that the acceleration effects due to small curvature in the flow direction can be safely neglected to leading order; as will be shown below, fluid inertia is already a higher-order effect in the described analysis because of the small Reynolds numbers.

The crucial steps in idealization of the geometry are now described, which enable for the analysis. In actual practice, the length L of the channel is large, typically of the order of 100H. This suggests that the flow at locations far away from the entry and exit regions would be "fully developed", that is, independent (to leading order) of the actual conditions prevalent at the inlet and outlet of the device. Thus the fully developed flow can be analyzed in a straight segment of length L* which is still assumed to be large compared to H, but whose entry and exit points are "far away" from the entry and exit regions of the actual device shown in FIGS. 1A and 1B in conclusion, the flow in the geometry of FIGS. 2A and 2B is to be analyzed, where $$L^*/H \to \infty, \ X_i/H \to \infty, \ (L-X_o)/H \to \infty.$$

The flow rates are extremely small because of the small pressure differentials driving the flow. Therefore, as described hereinafter, the "quasi-steady" approximation is made: the time derivatives drop out to leading order in a suitably non-dimensionalized version of the governing equations. FIGS. 2A and 2B represent these assumptions.

Figure 2A:
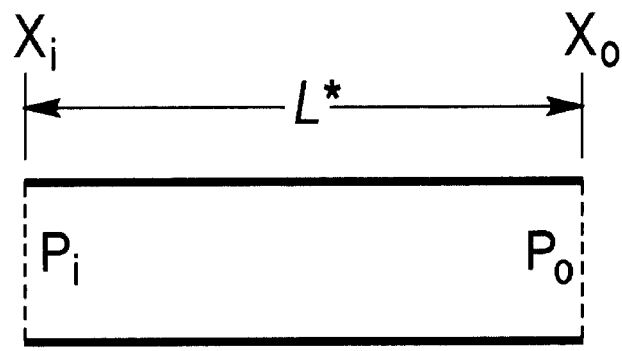
FIGS. 2A and 2B are side and end views of a revised schematic representation of a portion of the channel represented in FIG. 1.
Figure 2B:
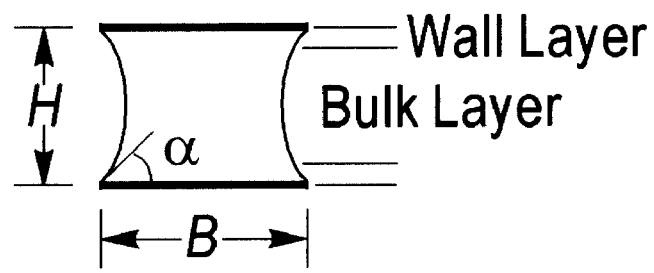

The flow rate in the device of FIG. 2A depends only on the (instantaneous) pressure gradient, which itself changes slowly with time. This pressure gradient may be obtained as follows. Let the radii of curvature of the meniscus at the inlet and outlet compartments be $R_1$ and $R_2$ at some given instant, as shown in FIG. 1B.

Given the volumes of fluid at the inlet/outlet compartments and the contact angle $\alpha$ (which is a thermodynamic parameter dependent only on the propellant and the material of the PMD, usually titanium or stainless steel), $R_1$ and $R_2$ may be easily calculated. The Laplace-Young equation relates the ambient pressure $P_0$ to the fluid pressure $P$ at the interface as follows $$P_0 - P = \sigma \left[ \frac{1}{R_a} + \frac{1}{R_b} \right], \quad (1)$$

where $R_a$ and $R_b$ are the principal radii of curvature of the meniscus in two mutually perpendicular directions and c is the surface tension coefficient. Using this formula, the instantaneous pressure difference can be obtained for the device of FIG. 1 as follows:

$$P_1 - P_2 = 2\sigma \left[ \frac{1}{R_2} - \frac{1}{R_1} \right]. \quad (2)$$

Because the velocity of the fluid is small, upon using Bernoulli's equation, the pressure drops across the inlet/exit compartments can be neglected and thus the pressure drop across the channel of length L in FIG. 1A is $P_1-P_2$.

The entry/exit regions are assumed to be small compared to the length of the device and may therefore be neglected; that is, the flow is "fully developed" over most of the length L. This is an excellent approximation because the length L is large compared to H and the flow rates/pressure gradients are small.

The approximation $L^* \approx L$ can be made without significant loss of accuracy and take the (instantaneous) leading-order pressures at the inlet and outlet of the device of FIG. 2 to be $P_1$ and $P_2$ respectively.

The problem now is to (i) figure out the flow rate at this instant; (ii) to repeat this calculation for various other pressure drops till the inlet/outlet pressures in FIG. 1 equalize (that is, the meniscus radii satisfy $R_1=R_2$); and (iii) finally determine the total drainage time by integration. Having fixed the length and the leading-order inlet/outlet pressures in the device, the crucial issue of the shape of the free surface is addressed next, so that the flow rate calculation can proceed.

Figure 3:
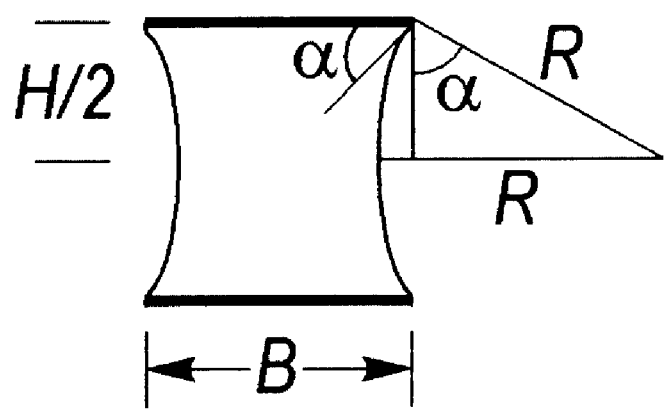
FIG. 3 is an end view of a schematic representation of a flow geometry of FIG. 1 in an assumed static case of no fuel flow through the geometry.

To gain some insight, first consider the static case when the inlet and outlet pressures in FIG. 2A are equal and there is no flow, as represented in FIG. 3. The free surface (at any given location X) in this case is shown in FIG. 3 and has the shape of an arc of a circle, because the pressure across the entire cross-section must be uniform. Further, the contact angle $\alpha$ must be maintained and this gives the radius of curvature of the free surface in FIG. 3 as:

$$R = \frac{H}{2\cos\alpha}. \quad (3)$$

Now consider the situation in which there is a small steady pressure gradient and therefore a small flow rate in FIG. 2.

Intuitively, the free surface shape still tends to be "nearly circular"; in other words, the pressure does not vary much across most of the cross section in FIG. 3, at any given location X. Further, assuming that the solid surfaces are highly polished, the contact angle must still be maintained.

The only way to reconcile these two requirements is to assume that the free surface is circular (to leading order) everywhere except for small layers near the walls, where the contact angle requirement would force a deviation. The radius of curvature of this circular part at any instant of time is be determined by the corresponding leading-order pressure at any given location X and the Laplace-Young equation. In general, the analysis of the wall-layers is cumbersome analytically.

The question that naturally arises is whether the (instantaneous) flow rates can be estimated without having to deal with these layers. If the contact angle condition is ignored and it is assumed that the wall layers are non-existent (and therefore that the free surface has uniform curvature throughout the cross-section), the flow rate becomes indeterminate, as demonstrated below.

Figure 4A:
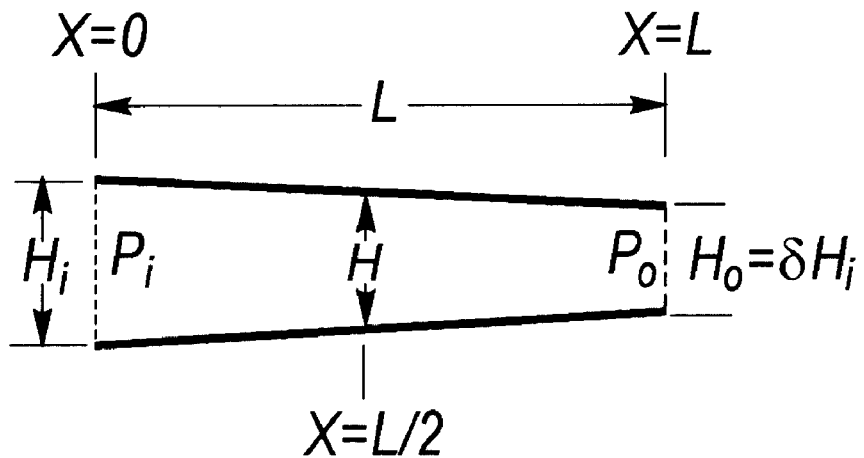
FIGS. 4A and 4B are side and end views of a schematic representation of a modified flow geometry in a linear gradient is assumed in the channel height.
Figure 4B:
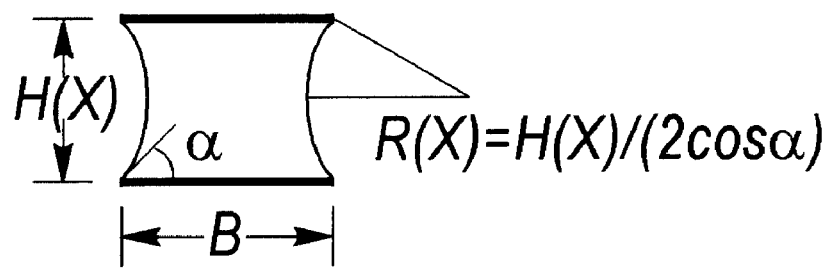

Instead, to deal with these conflicting requirements, the "fully developed" instantaneous flow rates are calculated for a modified geometry in which a small linear gradient is introduced in the channel height H, as shown in FIG. 4B.

This assumption obviates the wall layer issues and imposes a free surface that has everywhere, to leading order, a constant radius of curvature that does satisfy the contact angle requirement of (3). At the inlet and outlet of this modified device, the channel heights are given by $$H_i = \frac{2H}{1+\delta}, \quad H_o = \frac{2\delta H}{1+\delta} = \delta H_i. \quad (4)$$

Here $\delta$ is a parameter satisfying $0<\delta \leq 1$ and is chosen as follows. Note that $\delta$ is fixed so that the average channel height is H (which occurs at the middle section of the device because of the linear gradient). The radii of curvature of the free surface of the device of FIG. 4B at the inlet and outlet is obtained from (3):

$$R_i = \frac{H_i}{2\cos\alpha}, \quad R_o = \frac{H_o}{2\cos\alpha}. \tag{5}$$

Assume that the curvature of the free surface in the flow direction (X) in the geometry of FIGS. 4A and 4B is negligibly small (i.e., the radii of curvature in the flow direction are much larger as compared to $R_i$ and $R_o$). This assumption is justified in what follows. From (1), the pressure difference between the inlet and the outlet of the device can be deduced as:

$$P_1 - P_2 = \sigma\left[\frac{1}{R_o} - \frac{1}{R_i}\right]. \tag{6}$$

Equating this result with the right hand side of (2) and upon using (4) and (5), a quadratic equation for δ is obtained, which is solved as follows:

$$\delta = \sqrt{T^2+1} - T, \quad T = \frac{H}{\cos\alpha}\left[\frac{1}{R_2} - \frac{1}{R_1}\right]. \tag{7}$$

Note that δ does satisfy 0<δ≦1 as required. Typically it is expected that T→0 and δ→1, because H is very small as compared to the compartment meniscus radii $R_1$ and $R_2$.

Consider the rationale for modifying the geometry of FIG. 2A to that in FIG. 4A. This is difficult to justify rigorously from a mathematical point of view. The expectation is that at least when δ→1, this modification affects only the flow in the small layers near the wall, but without disturbing the contact angle; as will be shown, the computed solution actually maintains the contact angle to higher order.

Since the free surface in the bulk of the cross-section is unaffected and the contact angle is also maintained, the computed flow in the modified geometry of FIG. 4A is expected to be close to that in FIG. 2A.

In summary, the problem now is to determine the flow rate at each instant in the idealized geometry of FIGS. 4A and 4B given the volumes of fluid at the inlet and outlet compartments, the meniscus radii $R_1$ and $R_2$ may be calculated; equation (7) then gives δ. The instantaneous pressure drop, $P_1-P_2$, is given by (2) and to leading order the free surface has uniform curvature at every cross-section, with the radius of curvature being calculated from the requirement that the contact angle be maintained. For example, equation (5) determines the radii of the free surface at the inlet and outlet of the device, while (3) determines that at the middle section (X=L/2).

Idealization of The flow Equations

Above the flow is assumed to be quasi-steady. As a result, the instantaneous time dependence of the flow equations are ignored. A "slowly varying" (with respect to time) pressure drop is being imposed on the device of FIGS. 4A and 4B; δ starts with a value close to 1 and very slowly reaches the value of 1, when the pressures at the inlet and outlet of the PMD in FIG. 1A get equalized. This assumption holds well in practice because the inlet and outlet compartments have much larger cross-section areas as compared to that of the channel.

As the flow rates are extremely small, the temporal rates of change of the compartment levels and therefore of the meniscus radii and the corresponding fluid pressures are also extremely small. Secondly the length L of the device is assumed to be large as compared to the channel height H and all quantities in the "fully developed" region of FIG. 2A (and hence FIG. 4A) are also "slowly varying" in the flow direction, X. All lengths are non-dimensionalized with respect to $H_i$ of (4) and the coordinate system (x, y, z) is introduced together with a small parameter ε where $$x=X/H_i, \; y=Y/H_i, \; z=Z/H_i, \; \epsilon=H_i/L.$$

All variables in the flow equations are assumed to be functions of εx in order to translate the above assumption into practice. The equations for the channel height and the (leading-order) free-surface shape in non-dimensional form are given by:

$$\omega(\xi) \equiv \frac{1}{2}[(\delta-1)\xi + 1], \tag{8}$$

$$(-\omega(\xi) \le y \le \omega(\xi), \; \xi \equiv \epsilon x, \; 0 \le \xi \le 1),$$

$$-f(\xi, y) \le z \le f(\xi, y), \tag{9}$$

$$f(\xi, y) \equiv \frac{b}{2} + \omega(\xi)\tan\alpha - \sqrt{\frac{\omega^2(\xi)}{\cos^2\alpha} - y^2}, \; b = \frac{B}{H_i}.$$

Figure 5A:
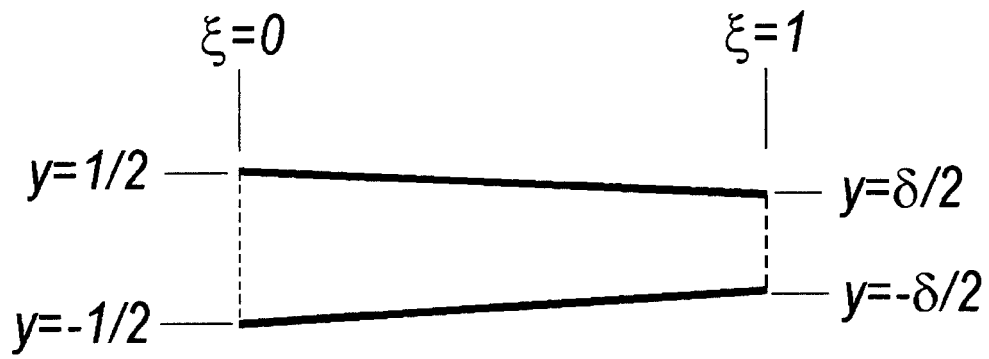
FIGS. 5A and 5B are side and end views of a non-dimensionalized schematic representation of the modified flow geometry of FIG. 4.
Figure 5B:
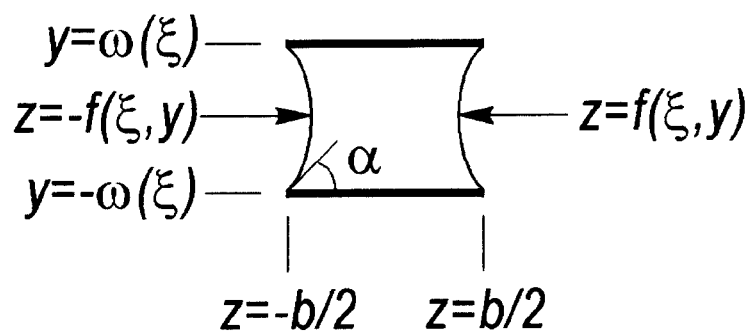

FIGS. 5A and 5B illustrate the coordinate system and the geometry of FIGS. 4A and 4B in non-dimensional form. Equations (8) and (9) are in tune with the above assumptions, namely that a linear gradient in the channel height and a uniformly circular shape of the leading-order free surface (which maintains the contact angle at all x) are imposed. Now let the velocities, pressure and surface tension coefficient be non-dimensionalized by V*, P* and σ*, where $$V^* = \frac{P^*H_i}{\mu}, \quad P^* = P_1-P_2, \quad \sigma^* = H_iP^*.$$

Here μ is the fluid viscosity and (2) and (4) define the other quantities. Now let (u, v, w) be the non-dimensional velocity components in the (x, y, z) coordinate directions and let p and λ be the non-dimensional pressure and surface tension coefficient (λ=σ/σ*). Note that λ may be obtained from the following:

$$\lambda \equiv \frac{\sigma}{H_i(P_1-P_2)} = \frac{\delta}{2(1-\delta)\cos\alpha}. \tag{10}$$

The second equality follows from follows from (4)–(6). The above non-dimensionalization yields a Reynolds number ($R_e$) given by $$R_e = \frac{H_i^2 P^* \rho}{\mu^2}. \tag{11}$$

The non-dimensional fluid pressure p may now be obtained from (1) as follows, upon neglecting the curvature of the free surface in the flow direction (which, from (9), may easily seen to be of higher order):

$$p(\xi, y, z) - p_0 = -\frac{\lambda\cos\alpha}{\omega(\xi)} + \hat{p}(\xi, y, z), \tag{12}$$

where $\hat{p}$ is a higher-order term satisfying $\hat{p}(\xi, y, z)=O(\epsilon)$.

Here $p_0$ is the non-dimensional ambient pressure. Assume that $R_e$ is sufficiently small such that $$\epsilon^2(1-\delta)R_e \ll 1. \tag{13}$$

The inertial terms in the perturbed flow equation can be neglected. Assuming that the component velocities (u, v, w) are each functions of ($\xi$, y, z) and upon neglecting all higher-order terms (in particular, the time derivatives, the inertial terms and all second derivatives with respect to x) in the Navier-Stokes equations, the following equations are obtained to leading order:

$$\Delta u = -\frac{\varepsilon(1-\delta)\lambda\cos\alpha}{2\omega^2(\xi)}, \quad \Delta v = p_y, \quad \Delta w = p_z, \tag{14}$$

where $$\Delta \equiv \frac{\partial^2}{\partial y^2} + \frac{\partial^2}{\partial z^2},$$

and the continuity equation is given by $$u_x + v_y + w_z = 0. \tag{15}$$

Here the subscripts denote partial derivatives. Solutions to (14) and (15) in which u is symmetric about the planes y=0 and z=0 and v and w satisfy the corresponding obvious symmetry conditions in y and z as indicated, for example, by (15). Only the domain in which y and z are non-negative is considered. These symmetry conditions are specified by:

$$u_y = v = w_y = 0 \text{ at } y=0 \text{ and } u_z = v_z = w = 0 \text{ at } z=0. \tag{16}$$

At the solid wall y=$\omega$, the no-slip and no-normal velocity boundary conditions must be satisfied:

$$(u, v, w) = (0, 0, 0) \text{ at } y=\omega(\xi), z\in[0, b/2], \xi\in[0, 1]. \tag{17}$$

At the free surface, the normal component of the vector velocity u [=(u, v, w)] must vanish. This may be stated to leading order as follows:

$$u \cdot \nabla(f(\xi, y)-z) \equiv \varepsilon u f_\xi + v f_y - w = 0 \text{ at } z = f(\xi, y), (y\in[0, \omega(\xi)] \text{ and } \xi\in[0, 1]). \tag{18}$$

Here $\nabla$ is the gradient vector ($\partial/\partial x$, $\partial/\partial y$, $\partial/\partial z$). In the ensuing section, the terms $\varepsilon u$, v and w in the above equation are shown to be all $O(\varepsilon_2)$; in particular, the assumption that the flow is "locally parallel" cannot be made here because the contribution from the term proportional to u is, in general, not negligible. The dynamic boundary condition at the free surface is that the stress be continuous across the interface, except for surface tension effects. The normal component of the stress at the free surface, which is the sum of the pressure and the dynamic stress terms, must therefore satisfy the dynamic equivalent of the Laplace-Young equation (which is already imposed to leading order in (12)). Since the gas phase does not support shear stresses, the tangential component of the stress at the free surface must vanish; this condition may be stated as:

$$\tau_t = 0 \text{ at the free surface}, \tag{19}$$

where $\tau_t$ is the tangential component of the stress.

Finally, note that the perturbation pressure $\hat{p}$ (where $\hat{p}$ represents the $O(\varepsilon)$ component of the pressure indicated in (12)) induces a higher-order perturbation to the free surface that, in general, is of non-uniform curvature. The condition that the perturbed free surface maintain the contact angle along the contact line (y, z)=($\omega$, b/2) is also required to hold. This condition is somewhat complicated because of the fact that the leading-order free surface also exhibits an $O(\varepsilon(1-\delta))$ deviation from the actual physical contact angle, which is a three-dimensional entity (defined as the angle between the normal to the free surface and the normal to the solid boundary at the contact line).

Solution Procedure

The solution procedure is now outlined, skipping the obvious algebraic details. An attempt is made to provide qualitative justification for some of the steps in this procedure. Define $$\phi_n(\xi) \equiv \frac{(2n-1)\pi}{2\omega(\xi)}, \quad n = 1, 2, \ldots \text{ and } \kappa_m = \frac{2m\pi}{b}, \tag{20}$$

$$m = 0, 1, 2, \ldots$$

In what follows the functional dependencies of various quantities (for example on $\xi$) will be assumed to be understood when not indicated. A solution u to (14) and (15) that satisfies (16) is assumed as follows:

$$u = (u_3, v_3, w_3) + (0, v_2, w_2), \tag{21}$$

where the two velocity vectors on the right hand side each satisfy (14) and (15) (but not necessarily (16)) and are three-dimensional (3-D) and planar respectively. The planar velocity $(0, v_2, w_2)$ has a parametric dependence on $\xi$ and can be expressed in terms of a stream function that satisfies the biharmonic equation in the y-z plane.

Three-dimensional Solution

First the three-dimensional solution for the flow rate calculation is described. The most general solution for u that satisfies (14), (16) and (17) is given by:

$$u_3 = \frac{(1-\delta)\varepsilon(\omega^2 - y^2)\lambda\cos\alpha}{4\omega^2} + \varepsilon\sum_{n=1}^{\infty} A_n(\xi)\cos(\phi_n y)\cosh(\phi_n z), \tag{22}$$

where $A_n$ represent arbitrary functions; determination of these yields the flow rate. Note that each term of the series in (22) is a harmonic (in y and z) eigenfunction; the quadratic term satisfies (14). The functional form for $w_3$ is assumed as a double Fourier series, as follows:

$$w_3 = \varepsilon^2 \sum_{m=1}^{\infty}\sum_{n=1}^{\infty} C_{mn}(\xi)\cos(\phi_m y)\sin(\kappa_n z), \tag{23}$$

where $C_{mn}$ are functions to be determined. Upon substituting the above into the continuity equation (15) and integrating, the following equation is obtained for $v_3$, with primes indicating differentiation with respect to $\xi$:

$$v_3 = \frac{(1-\delta)^2\varepsilon^2 y^3 \lambda\cos\alpha}{12\omega^3} + \varepsilon^2\sum_{n=0}^{\infty} B_n(\xi)\cos(\kappa_n z) - \tag{24}$$

$$\frac{2\varepsilon^2\omega}{\pi}\sum_{n=1}^{\infty}\frac{A'_n}{(2n-1)}\sin(\phi_n y)\cosh(\phi_n z) +$$

$$\frac{\varepsilon^2(1-\delta)}{2\omega}\sum_{n=1}^{\infty}A_n[\{\varphi_n^{-1}\sin(\phi_n y) - y\cos(\phi_n y)\}\cosh(\phi_n z) -$$

$$z\sin(\phi_n y)\sinh(\phi_n z)] -$$

-continued $$\frac{4\omega}{b}\varepsilon^2\sum_{m=1}^{\infty}\sum_{n=1}^{\infty}\left(\frac{n}{2m-1}\right)C_{mn}\sin(\phi_m y)\cos(\kappa_n z),$$

where $B_n$ are arbitrary functions, to be determined. Note that requiring $v_3$ to satisfy (16) forces $B_n=0$ for all n. This is not done here for reasons outlined below. The asymmetry introduced is taken care of by a corresponding asymmetry in $v_2$. By substituting (23) and (24) into (14), suitable expressions are obtained for $p_y$ and $p_z$. Note that the terms proportional to $A_n$ and $A'_n$ in (24) are harmonic. Upon requiring $p_{yz}=p_{zy}$, that the z-dependence of this equation is found to be identically satisfied; the y-dependence may be shown to hold upon using orthogonality, i.e., multiplying by $\sin(\phi_j y)$, $j=1,2,\ldots$, and integrating on $y\in[0, \omega]$. This procedure results in $C_{mn}$ being determined as follows:

$$C_{mn}(\xi)=D_{mn}(\xi)B_n(\xi),\, m=1,2,\ldots,\, n=1,2,\ldots \quad (25)$$

where $D_{mn}$ is defined by $$D_{mn}(\xi) \equiv \frac{32n^3\pi^2}{(2m-1)b^3[\phi_m^2(\xi)+\kappa_n^2]\left[\phi_m(\xi)+\frac{8\omega(\xi)n^2\pi}{(2m-1)b^2}\right]}.$$

Having satisfied the continuity and momentum equations, the boundary conditions are examined. The no-normal velocity condition (17) is imposed on $v_3$. Insert (25) into (24), set $y=\omega$ and require $v_3=0$; multiplying the resulting equation by $\cos k_j z$, $j=0,1,2,\ldots$ and integrating on $z\in[0, b/2]$ (using orthogonality), the following expressions are obtained for $B_j$:

$$B_0(\xi) = -\frac{(1-\delta)^2\lambda\cos\alpha}{12} + \frac{8\omega^2(\xi)}{b\pi^2}\sum_{n=1}^{\infty}\frac{(-1)^{n+1}A'_n(\xi)}{(2n-1)^2}\sinh\left[\frac{\phi_n(\xi)b}{2}\right] - \quad (26)$$

$$\frac{(1-\delta)}{b\pi}\sum_{n=1}^{\infty}\frac{(-1)^{n+1}A_n(\xi)}{(2n-1)}\left\{\frac{4}{\phi_n(\xi)}\sinh\left[\frac{\phi_n(\xi)b}{2}\right] - b\cosh\left[\frac{\phi_n(\xi)b}{2}\right]\right\},$$

and for $j\geq 1$, $$B_j(\xi) = \frac{8\omega(\xi)}{b\pi}\sum_{n=1}^{\infty}\left[\frac{(-1)^{n+1}J_{nj}(\xi)A'_n(\xi)}{2n-1}\right] + \quad (27)$$

$$\frac{2(1-\delta)}{b\omega(\xi)}\sum_{n=1}^{\infty}(-1)^n A_n(\xi)\left[\frac{J_{nj}(\xi)}{\phi_n(\xi)} - I_{nj}(\xi)\right],$$

where $$J_{nj}(\xi) = \frac{(-1)^j 2\omega(\xi)(2n-1)b^2\sinh\left[\frac{\phi_n(\xi)b}{2}\right]}{\pi H_j(\xi)[(2n-1)^2 b^2 + 16\omega^2(\xi)j^2]},$$

$$I_{nj}(\xi) = \left[\frac{16\omega^2(\xi)j^2}{\{16\omega^2(\xi)j^2+(2n-1)^2 b^2\}H_j(\xi)}\right] \times$$

$$\left[\frac{(-1)^j(2n-1)b^3}{16\omega(\xi)j^2\pi}\cosh\left\{\frac{\phi_n(\xi)b}{2}\right\} + \left\{\frac{1}{\phi_n(\xi)} - \frac{(2n-1)b^2}{8\omega(\xi)j^2\pi}\right\}J_{nj}(\xi)\right],$$

and $H_j$ is defined by $$H_j(\xi) = 1 + \frac{4\omega(\xi)j}{b}\sum_{m=1}^{\infty}\frac{(-1)^m D_{mj}(\xi)}{2m-1}.$$

The terms $w_3$ and $v_3$ in (23)–(24) can be expressed in terms of only $A_n$ (and its derivatives) as the unknown functions. In order to determine these, if the free surface boundary condition (18) is implemented, a vector first order ordinary differential equation is obtained, in which the independent variable is $\xi$ and the dependent variable is the vector $[A_1(\xi), A_2(\xi), \ldots A_N(\xi)]$ (where the number of unknowns is truncated at N). The solution to this differential equation may be uniquely determined only if an additional constraint is specified. The relevant condition is that the flow rate in the device be a constant, independent of $\xi$:

$$\Theta(\xi) = \varepsilon\Gamma = \text{constant for all } \xi \in [0, 1], \quad (28)$$

$$\text{where } \Theta(\xi) \equiv 4\int_0^{\omega\lambda(\xi)}\int_0^{f(\xi,y)} u_3(\xi, y, z)\, dz\, dy.$$

Note that it cannot be taken for granted that Equation (28) is automatically satisfied even if the condition is not imposed, because the 3-D solution fails to satisfy the symmetry constraint $v_3=0$ at $y=0$. The free surface boundary condition (18), when implemented for the 3-D component $u=(u_3, v_3, w_3)$, may be stated as follows (upon using (25)–(27) to eliminate $C_{mn}$ and $B_n$ from (23)–(24)):

$$\sum_{n=1}^{\infty}[P_n(\xi, y)A'_n(\xi) + Q_n(\xi, y)A_n(\xi)] = R(\xi, y). \quad (29)$$

Here the expressions for $P_n$, $Q_n$ and R are given directly below. Upon substituting for $u_3$, (28) reduces to:

$$\sum_{n=1}^{\infty}[\Phi_n(\xi)A_n(\xi)] - \Gamma = -\Gamma_Q(\xi), \quad (30)$$

where $$\Phi_n(\xi) = \frac{4}{\phi_n(\xi)}\int_0^{\omega\lambda(\xi)}\cos[y\phi_n(\xi)]\sinh[f(\xi, y)\phi_n(\xi)]\, dy,$$

and $$\Gamma_Q(\xi) = (1-\delta)\gamma\omega^2(\xi)\left[\frac{2\sin\alpha}{3} - \frac{1}{4\cos\alpha}\left\{\frac{(\pi-2\alpha)(1+2\cos 2\alpha)}{2(1+\cos 2\alpha)} + \frac{\tan\alpha}{2}(2+\cos 2\alpha)\right\}\right] + [b\omega(\xi)(1-\delta)\lambda\cos\alpha]/3. \quad (31)$$

Equations (29) and (30) are critically important in the described solution scheme in the sense that their satisfaction guarantees the existence of the planar solution; this issue is discussed further below.

The problem now is to solve (29) and (30) for the unknown functions $A_n(\xi)$ and the constant $\Gamma$ (which determines the flow rate as specified in (28)). The numerical algorithm that accomplishes this solution is later described.

The 3-D component of the term $\hat{p}$ in (12) may now be stated as:

$$\hat{p}_3(\xi, y, z) = \frac{\varepsilon^2(1-\delta)^2[y^2 - \omega^2(\xi)]\lambda\cos\alpha}{4\omega^3(\xi)} + \qquad (32)$$

$$\frac{\varepsilon^2 b}{2\pi}\sum_{m=1}^{\infty}\sum_{n=1}^{\infty}\frac{C_{mn}(\xi)}{n}[\phi_m^2(\xi) + \kappa_n^2]\cos[\phi_m(\xi)y]\cos(\kappa_n z),$$

where $C_{mn}$ is specified by (25) and (27). After simplifications:

$$\partial \hat{p}_3/\partial y = 4\omega(\xi)\epsilon^2 R(\xi)/b, \text{ at } (y, z) = (\omega, b/2), \qquad (33)$$

where:

$$R(\xi) = \sum_{n=1}^{\infty}[F_n(\xi)A_n'(\xi) + G_n(\xi)A_n(\xi)] - S(\xi). \qquad (34)$$

Here $F_n$, $G_n$ and $S$ are defined by $$F_n(\xi) = \frac{8\omega(\xi)}{b\pi(2n-1)}\sum_{j=1}^{\infty}\frac{(-1)^{j+n+1}}{j}E_j(\xi)J_{nj}(\xi),$$

$$G_n(\xi) = \frac{2(1-\delta)}{b\omega(\xi)}\sum_{j=1}^{\infty}\frac{(-1)^{j+n}}{j}E_j(\xi)\left[\frac{J_{nj}(\xi)}{\phi_n(\xi)} - I_{nj}(\xi)\right],$$

$$S(\xi) = -\frac{2(1-\delta)^2\lambda\cos\alpha}{b\omega(\xi)},$$

and $E_j$ is given by $$E_j(\xi) = \sum_{m=1}^{\infty}(-1)^m(2m-1)D_{mj}(\xi)[\phi_m^2(\xi) + \kappa_j^2].$$

As described hereinafter, a weighted least-squares algorithm is used to implement (29) and (30). In the least-squares procedure the requirement $R(\xi)=0$ in (34) is included, with an extremely small weightage. The idea is that the deviations from $R(\xi)=0$ in the 3-D solution are kept at manageable levels but without compromising on (29) and (30); if this condition is not imposed, the flow rate is not significantly affected, but the stresses at $y=\omega$ especially near the contact line, become large. If the weightage given to $R(\xi)=0$ is sufficiently small, the performance of the algorithm with respect to (29) and (30) also actually improves.

In general, the 3-D solution exhibits deviations from (19) that are $O(\epsilon)$ everywhere (except possibly at the contact line). Neglect of the boundary condition (19) to leading order is justified by the fact that normal stress at the free surface, (namely, the pressure to leading order), is $O(1/(1-\delta))$, as is evident from (10) and (12); this dominates the tangential component, which is $O(\epsilon)$.

Equation (19) may be taken care of at the next level of approximation, when the free surface is perturbed. This issue is not examined in detail. The basic idea is as follows: consider a class of perturbations to the free surface, of $O(\epsilon)$, such that the non-planar contribution to the tangential stress of the 3-D solution on the free surface at every cross-section in $\xi$ gets cancelled out for every member of this class except possibly for a small layer near the contact line.

The planar solution, described in the following section, determines the appropriate member of the above class such that (19) holds, except in the above-mentioned layer. In the layer near the contact line, it is, in general, not be possible to perturb the free surface as described above, unless slip is allowed (the so-called Navier slip condition) and the contact line becomes dynamic rather than static. This is so because of the constraint that the class of perturbed free surfaces must maintain the contact angle. Therefore Equation (19) does not hold at points on the free surface that are sufficiently close to the contact line, here assumed static. This is not surprising because the shear stress, in general, exhibit singular behaviour at the contact line. One interesting possibility is that the possible deviations from (19) near the contact line may be handled by permitting a non-linear gradient in the channel height $\omega(\xi)$, as follows:

$$\omega(\xi) = \frac{1}{2}[1+(\delta-1)\xi+C_2(\delta-1)^2\xi^2+C_3(\delta-1)^3\xi^3+\dots]$$

Equation (8) may be thought of as a linearization of the above as $\delta \to 1$ which does not significantly influence the leading-order flow rate and this justifies the linear gradient imposed on the channel height in (8).

Planar Solution

For the planar solution to exist, the net (two-dimensional) flow into every cross-section must vanish. If (29) and (30) are satisfied by the 3-D solution (and this is assumed to be the case), the object is to show that the boundary conditions for the planar solution is compatible with this requirement. Denote by $\psi(y, z; \xi)$ the stream function for the planar solution, with $$w_2 = \psi_y \text{ and } v_2 = -\Psi_z.$$

Then $\psi$ satisfies the biharmonic equation:

$$\Delta \bar{\omega} = 0, \text{ where } \bar{\omega} = -\Delta\psi. \qquad (35)$$

Here $\bar{\omega}$ is the vorticity of the planar solution. Let the free surface be perturbed as follows:

$$z = f_p(\xi, y) = f(\xi, y) + O(\epsilon).$$

For a suitable initial guess $f_p$ such that the non-planar contributions to the tangential stress vanishes everywhere (except possibly near the contact line), the following boundary conditions are imposed on the planar solution:

$$y = \omega(\xi): \psi = \psi_y = 0.$$

$$z = 0: \psi = \bar{\omega} = 0.$$

$$y = 0: \quad \psi = \varepsilon^2 z B_0(\xi) + \varepsilon^2 \sum_{j=1}^{\infty}\frac{B_j(\xi)\sin\kappa_j z}{\kappa_j},$$

$$\varpi = \varepsilon^2 \sum_{j=1}^{\infty}\kappa_j B_j(\xi)\sin\kappa_j z$$

$$z = f_p(\xi, y): \psi = 0, (\tau_2)_t = -(\tau_3)_t. \qquad (36)$$

Here $(\tau_2)_t$ represents the tangential component of the planar shear stress and can be expressed in terms of second derivatives of $\psi$; $(\tau_3)_t$ represents the $O(\epsilon)$ planar component of tangential shear stress of the 3-D solution at the perturbed free surface. At $y=0$, the stated boundary conditions represent the requirements that the deviation in $v_3$ be cancelled and that $\partial w_2/\partial y$ vanish. At the free surface $z=f_p$, the normal velocity component of the 2-D solution must vanish and hence it is required that $\psi=0$; the other stated boundary condition is that the deviation from (19) (in the plane) must vanish. This last condition may be suitably modified near the contact line so that the contact angle is maintained by the perturbed free surface to higher order. The perturbed free surface $f_p$ is determined iteratively such that in addition to the above boundary conditions, the dynamic equivalent of the Laplace-Young equation, imposed to higher-order on $f_p$, is satisfied by the full solution. Here three-dimensional effects must be accounted for in order to arrive at the higher-order terms in the normal stress balance. The basic assumption that is made is that there does exist a member of the above-mentioned family of perturbations on the free surface that this additional requirement holds.

Clearly if the planar solution exists, the full solution indeed satisfies all the boundary conditions (except for (19)) near the contact line). A crucial requirement for the existence of $\psi$ is apparent from (36). Denote $$f_0(\xi)=f(\xi, 0), \psi_0(\xi)=\psi(0, f_0; \xi).$$

To avoid a discontinuity in $\psi$ at the corner point (y, z)=(0, $f_0(\xi)$) (and therefore to ensure that the planar solution exists) $\psi_0(\xi)$ vanishes identically for all $\xi$. From (36), this requirement clearly reduces to:

$$\psi_0(\xi)/\varepsilon^2 = f_0(\xi)B_0(\xi) + \sum_{j=1}^{\infty} \frac{B_j(\xi)\sin[\kappa_j f_0(\xi)]}{\kappa_j} = 0 \quad (37)$$

$$= \frac{1}{\varepsilon^2} \int_0^{f_0} v_3(\xi, 0, z)dz$$

It is easy to show that (37) is true provided the 3-D solution satisfies (29) and (30); this follows from an elementary mass balance on a segment of the channel of length dx in FIG. 4. It is important to note that, in general, the planar solution does not exist if the 3-D solution fails to satisfy (29) and/or (30). For example, if (29) is false (but (30) is true) then the free surface condition in (36) must be modified in order to ensure that the three-dimensional contribution to the normal velocity from (29) is cancelled out. But then there is no guarantee that the two-dimensional mass balance is satisfied. Note that prescribed normal velocities are being imposed across all four walls of the cross-section, and need not be compatible; in general, an unacceptable discontinuity in $\psi$ at one of the corner points of the cross-section may result. This explains why the conditions (29) and (30) are required to be satisfied.

The numerical algorithm for the planar solutions is not described, as the implementation of such algorithms and techniques are well understood and widely practiced in the art. The perturbation solution may be further pursued by considering the O($\epsilon$) pressure term, which induces an O($\epsilon^2$) component in u via its pressure gradient and O($\epsilon^3$) terms in v and w via continuity, etc.

Justification for Solution Procedure

A couple of important assumption are involved in the solution procedure outlined above. The first of these is that $u_3$ and its first derivatives with respect to y and z are uniformly O($\epsilon$) everywhere (except possibly at the contact line, where the shear stresses could become large).

Secondly, a family of perturbations of O($\epsilon$) are assumed to exist to the leading-order free surface, which maintains the contact angle to this order and for which the non-planar component of the 3-D tangential stress at the free surface vanishes everywhere except possibly near the contact line. The planar velocity component $v_2$ and $w_2$, which are uniformly O($\epsilon^2(1-\delta)$) everywhere, must become rapidly varying in y and z in a layer near the free surface so that the induced pressure gradients and tangential stresses at the free surface become O($\epsilon$) and match the required boundary conditions.

The assumption made is that there does exist a member of the above family of perturbations which satisfies the above requirements. These assumptions are plausible, but obviously difficult to justify. The conclusion that there is significant viscous dissipation due to rapid variations in y and z in the planar solution near the free surface may be drawn. The dissipation significantly reduces the flow rate obtainable for the given average pressure gradient. Numerical solutions later described support this conclusion.

It can be considered whether requiring the 3-D solution to satisfy (29) and (30) is the only way to ensure that the planar solution exists. This would appear to be extremely likely. An alternative method, if it exists, must work at every location in $\xi$. However, there are other possible solutions than the one proposed here which is discussed below.

Consider the following modification of (23):

$$w_3 = \qquad (38)$$

$$\varepsilon^2 \sum_{m=1}^{\infty}\sum_{n=1}^{\infty} C_{mn}(\xi)\cos(\phi_m y)\sin(\kappa_n z) + \varepsilon^2 \sum_{m=1}^{\infty} \Xi_m(\xi)\cos(\phi_m y)\sinh(\phi_m z),$$

where $\Xi_m(\xi)$ are arbitrary functions. The additional terms in (38) represent harmonic (in y and z) eigenfunctions that induce a corresponding change in $v_3$ (Eq. (24)) via the continuity equation. Equation (25) still holds, but (26) and (27) would have to be suitably modified. The point is that there are now extra degrees of freedom available to satisfy (29) and (30). It appears that the functions $\Xi_m(\xi)$ can be fixed arbitrarily and different choices, in general, lead to different coefficients $A_n(\xi)$ and hence different flow rates. Here it is important to recognize that the double Fourier series in (23), which vanishes on the closed boundary y=±ω, z=±b/2, does not contain within the series any harmonic terms. The only solution of Laplace's equation that so vanishes is zero.

The justification for setting $\Xi_m$=0 is that in the postulated "fully developed" zone, cross flow in the z-direction ought to be minimal. The harmonic terms in (38), which would induce corresponding harmonic terms in $v_3$ (via continuity) and $u_3$ (via the induced change in the coefficients $A_n$), represent such cross flow. It is expected that the cross flow represented by the double Fourier series is the minimum possible and is substantially cancelled near y=0 when symmetry is forced via the planar solution (refer ensuing paragraph). However, it is possible that non-zero $\Xi_m$ are needed, especially for larger contact angles/aspect ratios, to justify some of the assumptions made in the previous paragraph and to ensure the success of the iterative procedure by which the planar solution is determined.

Let us now consider an alternative solution procedure that may at first sight look easier and more logical. Let $w_3$ be chosen as in (38). Suppose the symmetry requirement is imposed on $v_3$ and therefore $B_j$=0 in (24). Then by (25) it is required that $C_{mn}$=0 and hence $w_3$ consists only of the harmonic terms. One consequence is that now $v_3$ (obtained from continuity as before) does not satisfy the no-normal velocity condition at y=ω.

The question is whether $\Xi_m$ and $A_n$ can be chosen to satisfy this condition in addition to suitably modified versions of (29) and (30) (with the planar solution being used only for the purpose of satisfying the contact angle requirement). The catch here is that this 3-D solution is not the most general possible because the z-component $w_3$ is restricted to be harmonic.

This solution procedure fails for the special case in which $\Xi_m=0$ and the no-normal velocity condition at $y=\omega$ is ignored (this can always be taken care of by the planar solution). When attempting to satisfy (18), the coefficients $A_n$ rapidly diverge with increasing n, making the resulting velocities large and oscillatory. In summary, a non-harmonic $w_3$ as postulated by the double Fourier series in (23) appears to be necessary in order to be able to implement (18) and determine $A_n(\xi)$.

Energy considerations are used to derive an upper bound for the flow rate. Consider the geometry of FIG. 2 in which the channel width is B, the height is H (with no gradient imposed) and with the instantaneous pressure difference over the length L being given by (2). Assume further that the "free surface" is in fact a solid boundary with slip allowed (but no normal velocity) and has the shape of a circular arc that maintains the contact angle. If $\delta$ is calculated as in (7) and using the same non-dimensionalization as before, the "fully developed" velocity profile in this device is:

$$u=(1-\delta)\epsilon[¼-y^2]\lambda \cos \alpha, v=0, w=0.$$

The solution for u is obtained from (22) by setting $A_n\equiv 0$ and $\omega=0.5$.

The flow rate in this hypothetical device, given by $\epsilon\Gamma_Q$ (0.5) (see (31)), is postulated to be an upper bound for the flow rate in the "actual" device of FIG. 4, computed by the prescribed solution procedure. The reason for this claim is that the actual device has the same (leading-order) pressure gradient and length as the hypothetical one, but also has cross-flow dissipation due to non-zero v and w.

Therefore a significant portion of the energy supplied to maintain the pressure gradient is dissipated in sending the fluid along a spiralling path from inlet to outlet, as compared to the straight path in the hypothetical device. This dissipation due to cross-flow is not negligible, as explained above.

Further, for a given contact angle, the ratio of the actual flow rate to this upper bound of $\epsilon\Gamma_Q(0.5)$ must decrease with increasing aspect ratio B/H, because cross-flow effects can be expected to increase as aspect ratio increases.

The computed solution satisfies these two important checks (in addition to others), as later shown. Note also that the computed flow rate must be the maximum possible for the given pressure gradient, given that the cross flow effects have been minimized.

Finally, an important question that arises is how small should the parameters $\epsilon$ and $(1-\delta)$ be in order for valid results to be obtained. One way to estimate this a posteriori is to check whether the perturbation pressure $\hat{p}$ is sufficiently smaller than the leading term in (12). Since $\lambda$ as defined in (10) is $O(1/[1-\delta])$, the criterion for validity of these results may be stated as:

$$|(1-\delta)\hat{p}(\xi, y, z)|<<1. \quad (39)$$

This equation must hold throughout the domain, but is particularly important at $z=f$, otherwise the assumed circular shape of the leading-order free surface would be in error. Note that $\hat{p}$ in (39) is given by $$\hat{p}(\xi, y, z)=\hat{p}_2(\xi, y, z)+\hat{p}_3(\xi, y, z)$$

where $\hat{p}_2$ is the contribution to the pressure from the planar solution and $\hat{p}_3$ is given by (32).

Equation (39) can be checked a posteriori, after the coefficients $A_n$ have been calculated for a given $\delta$ and after the planar solution is computed.

Advantages of Described Approach

Before presenting the numerical algorithm below, the significant advantages gained with the described semi-analytical approach are considered. First consider am important invariance property of the equations (29) and (30). Multiply (30) by $(1-\delta)$ and consider the $\delta$-dependent terms in (29) and (30). Observe that on the left hand side of these equations, the terms $A_n$ are multiplied by $(1-\delta)$; on the right hand side appears the term $(1-\delta)^2\lambda$, which, from (10), is proportional to $\delta(1-\delta)$; the $\xi$-dependence of every function in these equations occurs only through $\omega(\xi)$, which, via (8), is actually a function of $(1-\delta)\xi$ with no other $\delta$-dependent terms. These observations indicate the following transformations:

$$\hat{\xi}=(1-\delta)\xi, \omega(\xi)=\bar{\omega}(\hat{\xi}), A_n(\xi)=\delta \hat{A}_n(\hat{\xi}), \Gamma=\delta\hat{\Gamma}, A'_n(\xi)=\delta(1-\delta)\hat{A}'_n(\hat{\xi}). \quad (40)$$

Every other function of $\xi$ in (29) and (30) now becomes a "hatted" function of $\hat{\xi}$ with no explicit $\delta$-dependence. An explicit $\delta$-dependent terms are easily seen to drop out of the transformed equations; the only $\delta$-dependence of these "hatted" equations is via the fact that the range of the independent variable $\hat{\xi}$ is now on $\hat{\xi}\in[0, (1-\delta)]$.

Once these transformed equations (and hence (29) and (30)) have been solved for one particular value of $\delta$, say the initial (in time) value $\delta=\delta_0$, the transformed equation are in fact solved for all $\delta$ in the semi-open interval $[\delta_0, 1)$. This argument applies to R=0 in (34) as well, which is included (with a very small weightage) in the algorithm. In other words, the time dependence is effectively removed from the problem. Nevertheless it is convenient to push through the numerical solution of the equations in the stated form (with $\xi$ as the independent variable), subject to another transformation described in the ensuing section.

The advantages gained with the described approach can now be more clearly appreciated. As seen directly above, if successfully solved for the flow rate at the initial instant, the flow rate for all instants is solved. Secondly it is required only to discretize the first order derivatives of $A_n(\hat{\xi})$; since these are actually functions of $\hat{\xi}$, they are "slowly varying" provided $\delta\to 1$, as is usually the case. Therefore only a relatively crude grid in $\hat{\xi}$ is needed in order to obtain the desired accuracy.

Further, a higher-order accurate finite difference scheme can be used without running into numerical instability. Note that the "fast variations" in y and z (especially near the free surface) have been taken care of analytically. Because the shape of the free surface is known to leading order, no iterative procedures are needed. Also because exact solutions of the equations are used, the only concern involves the accuracy to which the boundary conditions are satisfied, in order to be reasonably certain that the small flow rates are accurately computed.

Contrast this approach with the standard "brute force" numerical simulation approach. A full-fledged three-dimensional time-dependent simulation in a complex geometry and to a very demanding accuracy (because of the small flow rates, of the order of $10^{-4}$ in non-dimensional terms) must be carried out. The entry and exit regions cannot be ignored, because otherwise the boundary conditions to be imposed are not known. The flow parameters are rapidly varying in all three directions at the entry/exit regions because of the rapid changes in the geometry; elsewhere the rapid variation is still present in the y- and z-directions.

Therefore the three-dimensional grid must be fine near these regions; in view of the accuracy demand, the fine spatial discretizations needed would make the computation extremely costly in terms of both time and memory. Further, the time discretiztion must also be fine in view of the well-known stability limitations of such algorithms (via the "CFL" criterion); for this reason, a higher-order spatially accurate scheme would make the computation costly in time as well. The cost factor is compounded by the fact that the free surface must be determined iteratively. Even if these formidable obstacles are overcome, the accuracy of the computed flow cannot be assured except via prohibitively expensive grid refinement studies.

In short, a full-fledged three-dimensional numerical simulation is fraught with difficulties and requires highly sophisticated numerical techniques implemented on a super-computer. When it is considered that with the present method, the total drainage time can be estimated in a single simulation (or maybe a few simulations, to optimize the numerical parameters) of a few seconds implemented on personal computer equipment as described below, the cost advantages alone are apparent.

The Numerical Algorithm

The numerical algorithm is now described in sufficient detail to instruct an implementation. A change of the dependent variables from $A_n$ to $\tilde{A}_n$ made as follows:

$$A_n(\xi) = \tilde{A}_n(\xi) \exp[-\phi_n(\xi) b/2]. \tag{41}$$

Upon differentiating with respect to $\xi$, the following is obtained:

$$A'_n = \exp[-\phi_n b/2] \left[ \tilde{A}'_n + \left\{ \frac{(2n-1)\pi b(\delta-1)}{8\omega^2} \right\} \tilde{A}_n \right].$$

The purpose of this transformation is to ensure that the coefficients of the matrix (in the system of linear equations to be solved) are all bounded as $n \to \infty$; this makes the matrix relatively better conditioned. Secondly, the finite difference discretization errors in $\tilde{A}'_n$ get scaled down by the exponential factor in the above equation and therefore translate into much smaller errors in $A'_n$.

Upon substituting (41) in to (29), (30) and R=0 in (34), the following is obtained:

$$\sum_{n=1}^{\infty} \left[ \tilde{P}_n(\xi, y) \tilde{A}'_n(\xi) + \tilde{Q}_n(\xi, y) \tilde{A}_n(\xi) \right] = R(\xi, y),$$

$$\sum_{n=1}^{\infty} \left[ \tilde{\Phi}_n(\xi) \tilde{A}_n(\xi) \right] - \Gamma = -\Gamma_Q(\xi),$$

$$\sum_{n=1}^{\infty} \left[ \tilde{F}_n(\xi) \tilde{A}'_n(\xi) + \tilde{G}_n(\xi) \tilde{A}_n(\xi) \right] = S(\xi),$$

where $$(\tilde{P}_n, \tilde{\Phi}_n, \tilde{F}_n) = \exp[-\phi_n b/2](P_n, \Phi_n, F_n),$$

$$(\tilde{Q}_n, \tilde{G}_n) = \exp[-\phi_n b/2](Q_n, G_n) + \left\{ \frac{(2n-1)\pi b(\delta-1)}{8\omega^2} \right\} (\tilde{P}_n, \tilde{F}_n).$$

In what follows, the tildes are dropped and the algorithm is described with respect to equations (29), (30) and (34). It is understood that the transformed equations, to which the algorithm equally applies, are actually being solved in practice. The interval $\xi \in [0, 1]$ is discretized into I equally spaced points ($\xi_i$, i=1,2, ..., I), where $\xi_1 = 0$ and I≥5. The grid spacing is given by h=1/(I−1). A fourth-order accurate finite difference scheme, using five-point interpolation, is used on this grid to discretize the derivatives $A'_n(\xi)$.

The details of this scheme are given below. Use the notation $\omega^i = \omega(\xi_i)$ and similarly for other functions. For all $\omega^i$, discretize $y \in [0, \omega^i]$ into M uniformly spaced points (in increasing order) $y^{il}$, where l=1,2, ..., M; denote by superscript il all functional dependencies on $y^{il}$. Let the number of harmonic eigenfunctions in (22) be truncated at N. Finally, let the number of terms in the j- and k-summations (which occur in the definitions of $P_n$, $Q_n$, $F_n$ and $G_n$) be truncated at J and K respectively. This corresponds to taking J and K terms in the n- and m-summations respectively in the double Fourier series of (23); for a given N, these must be suitably high, for example, to ensure that the no-normal velocity condition at the solid wall is satisfied to required accuracy. Note that there are IN+1 unknown constants $A_n^i$ and $\Gamma$ to be determined.

A weighted least-squares algorithm is used to implement (29), (30) and (34). This algorithm is simple to describe: form the weighted sum $\bar{S}$ of the squares of the errors in (29), (30) and (34) with weight factors $\theta_1$, $\theta_2$ and $\theta_3$ respectively; the summation is done over I points in each of (30) and (34) and IM points in (29). The requirement that that $\bar{S}$ be minimized yields the criterion that the partial derivative of $\bar{S}$ with respect to each of the IN+1 unknown constants n and $A_n^i$ must vanish (treating these unknowns as the only minimization variables); these provide the IN+1 equations for the unknowns.

The least-squares approach has been used successfully in recent times by Shankar (P. N. Shankar, The eddy structure in Stokes flow in a cavity. J. Fluid Mech. 250, 371 (1993); P. N. Shankar, Three-dimensional eddy structure in a cylindrical container. J. Fluid Mech. 342, 97 (1997)) to solve biharmonic and Stokes flow problems in two and three dimensions. Define $$\Psi_{jn}^{il} \equiv \frac{\partial}{\partial A_n^j} [P_n^{il} A_n'^i + Q_n^{il} A_n^{il} A_n^i],$$

and $$\mathfrak{I}_{jn}^i \equiv \frac{\partial}{\partial A_n^j} [F_n^i A_n'^i + G_n^i A_n^i]$$

Here the partial derivatives are interpreted in the usual way, treating the IN+1 unknowns $A_n^i$ and $\Gamma$ as the variables. The formulae for the above quantities are omitted here; these are obtained in a completely straightforward manner upon discretizing the derivative terms as outlined below. Further, define $$\tau(i) = 1, i \leq 5;$$

$$= i - 4, i > 5.$$

The least-squares algorithm for the discretization given below is as follows:

$$\sum_{i=1}^{I} \sum_{n=1}^{N} \left[ \sum_{l=1}^{M} \left\{ \theta_1 \Psi_{jm}^{il} \sum_{k=\tau(i)}^{\tau(i)+4} \Psi_{kn}^{il} A_n^k \right\} + \theta_3 (\mathfrak{I})_{jm}^i \sum_{k=\tau(i)}^{\tau(i)+4} (\mathfrak{I})_{kn}^i A_n^k \right] + \tag{42}$$

$$\theta_2 \Phi_m^j \left[ \sum_{n=1}^{\infty} (\Phi_n^j A_n^j) - \Gamma \right] =$$

-continued $$\sum_{i=1}^{I}\left[\theta_3(\mathfrak{I})_{jm}^{i}S^{i}+\theta_1\sum_{l=1}^{M}\Psi_{jm}^{il}R^{il}\right]-\theta_2\Phi_m^{j}\Gamma_Q^{j},$$

for j=1,2, ..., I and m=1,2, ..., N. Equations (42) and (30) (evaluated at ξ=0 and multiplied by the weight factor $\theta_2$) provide the IN+1 equations for the IN+1 unknowns. Here the terms $\Phi_n^j$, $\Gamma_q^j$, $S^i$ and $R^{il}$ are the discretized versions of the corresponding terms that appear on the right hand sides of (29), (30) and (34). In the implemented algorithm, the unknowns $A_n^i$ are numbered in the order (i=1, n=1,2, ..., N), (i=2, n=1,2, ..., N), ..., with Γ as the last unknown. The equations are ordered in similar fashion (with j and m taking the place of i and n in the above scheme), with (30) as the last equation. In addition to the change of variables mentioned at the beginning of this section, the matrix was pre-conditioned by normalizing the maximum magnitude in each column to 1.

Some comments on this algorithm follow. The weight factors used are:

$\theta_1=\theta_2=1$, $\theta_3=10^{-6}$ to $10^{-10}$.

Setting $\theta_3=0$ makes virtually no difference the flow rate, but affects the residual in (34). The algorithm is implemented in double precision and uses a linear equation solver which estimates the condition number of the matrix; despite the above-mentioned attempts at pre-conditioning, the condition numbers are of the order of $10^{13}$–$10^{17}$, which border on the limits of acceptability of a double precision code.

The condition number test applied was that the machine should not give the same values for the condition number C and C+1, when implemented in double precision. Although this test did not fail in the examples presented, it is nevertheless recommended that either more sophisticated pre-conditioning methods be used or that this algorithm be implemented in quadruple precision. For a given value of N (typically 4–10 for the examples considered here) some experimentation is needed to fix the optimal values of I, J, K and M.

Due to the high condition numbers, the convergence is extremely sensitive to the values of these parameters, as well as those of δ, α and the aspect ratio defined as B/H. It should be emphasized that the exact solution itself is not necessarily sensitive as indicated above.

The point is that if the algorithm yields an acceptable solution for a certain combination of parameters, making very small changes in these parameters may tend to make the algorithm fail. A different combination of parameters that work (in the sense described in the ensuing paragraph) may need to be found. Typically, I ranged from 5–20; J from 30 to 120; K from 15 to 60; and M from 100 to 200 in the examples presented in the ensuing section. The aspect ratios considered ranged from 1 to 8; the contact angle α, from 0° to 60°; and δ was set at 0.7. The problem is solved for one value of δ, which may be chosen according to convenience. In practice, δ is close to 1. The computation times on a personal computer are of the order of a few seconds or minutes; the memory requirements of this algorithm are negligible.

For estimating the convergence of the obtained solutions, the flow rates at various stations in ξ for a given combination of parameters are calculated and compared for equality. If the no-normal velocity boundary conditions at the free surface and the solid wall are more accurately satisfied, the discrepancy in the calculated flow rates at various ξ is lowered. An algorithm that computes these boundary conditions as well as the error in (37) was also implemented. Secondly, as N and/or I are increased, the flow rate should exhibit convergence. Finally, the finite difference scheme has a local truncation error of $O([h(1-\delta)]^4)$, as stated below. If I=10 (which implies h=1/9) and δ=0.7, the local truncation error is of the order of $10^{-6}$, which is about a couple of orders of magnitude less than those of the computed flow rates; in most cases, this level of accuracy is sufficient in order to obtain excellent results, which are presented in the ensuing section.

Numerical Results

A special solution is considered that is of relevance here. Suppose the harmonic solution in (22) is to vanish identically; that is, $A_n$=0 for all n. The resulting "quadratic solution" is given by $$u_q = \frac{\varepsilon(1-\delta)(\omega^2-y^2)\lambda\cos\alpha}{4\omega^2},$$

$$v_q = -\frac{(\varepsilon^2(1-\delta))^2\lambda\cos\alpha}{12}\left[1-\frac{y^3}{\omega^3}\right], \quad w_q \equiv 0.$$

The leading-order flow rate Θ(ξ) (=εΓ) is as defined in (28). The flow rate must, of course, be independent of ξ by continuity. If the quadratic velocity $u_q$ is substituted into the double integral of (28), the resulting flow rate $\Theta_q(\xi)$ (=$\varepsilon\Gamma_Q$(ξ); see (31)) would not be independent of ξ. The reason is that the quadratic profile does not satisfy the free surface boundary condition (18).

The addition of the harmonic correction term in (22) to this quadratic solution should therefore lead to a much better match of the flow rates at various stations than provided by the quadratic solution. This is one of the criteria used to estimate the convergence of the solution. Define the residual (i.e. the left hand side minus the right hand side) of (29), divided by $\varepsilon^2(1-\delta)^2$, as $R_f(\xi, y)$. Define as $R_{f_q}(\xi, y)$ the similarly scaled residual of (29) for the quadratic solution given above.

For the quadratic and computed solutions, a comparison of this residual as well as that of the normal velocity $v_t(\xi, z)$=$v_3(\xi, \omega(\xi), z)/[\varepsilon^2(1-\delta)^2]$ is given at various stations in ξ for the examples presented below (the y- and z- dependence, when they occur, are handled by taking root mean square over N equally spaced points; only the ξ-dependence is displayed). Note also that the quadratic solution has $v_t$≡0. For all the examples considered in this section, the following values of δ, the channel length L and height H along with the calculated value of ε, are used:

δ=0.7; L=0.67 m; H=0.005 m; ε=0.00878.

Four values of the contact angle α, namely, 0°, 15°, 30° and 60°, are considered. It must be kept in mind that for a given propellant and the material of the PMD (usually titanium or stainless steel), α is a constant which is close to zero for most propellants. In the tables that follow, β is the aspect ratio B/H and $\zeta_0(\xi)$ is defined as:

$\zeta_0(\xi)=\psi_0(\xi)/[\varepsilon^2(1-\delta)^2]$, where $\psi_0$ is given in (37); note that $\zeta_0(\xi)$ must vanish for the planar solution to exist. The scaling factor of $\varepsilon^2(1-\delta)^2$ chosen for these residuals is more stringent than required;

the appropriate scaling factor should be $\epsilon^2(1-\delta)$, which is the order of magnitude of $v_3$ and $w_3$.

The ratio $\upsilon=\Theta/\Theta_q(0.5)$ (here $\Theta$ can be evaluated at any value of $\xi$, since it is more or less constant) should always be less than one and should decrease with increasing $\beta$ for a given contact angle, as noted above. Two further quantities that appear are defined, for each specific run, as follows:

$\Theta_d$=maximum magnitude of difference in $\Theta(\xi)$ between any two grid locations in $\xi$, $\Theta_{dq}$=maximum magnitude of difference in $\Theta_q(\xi)$ between any two grid locations in $\xi$.

Obviously the object is to demonstrate that $\Theta_d<<\Theta_{dq}$.

Figure 6:
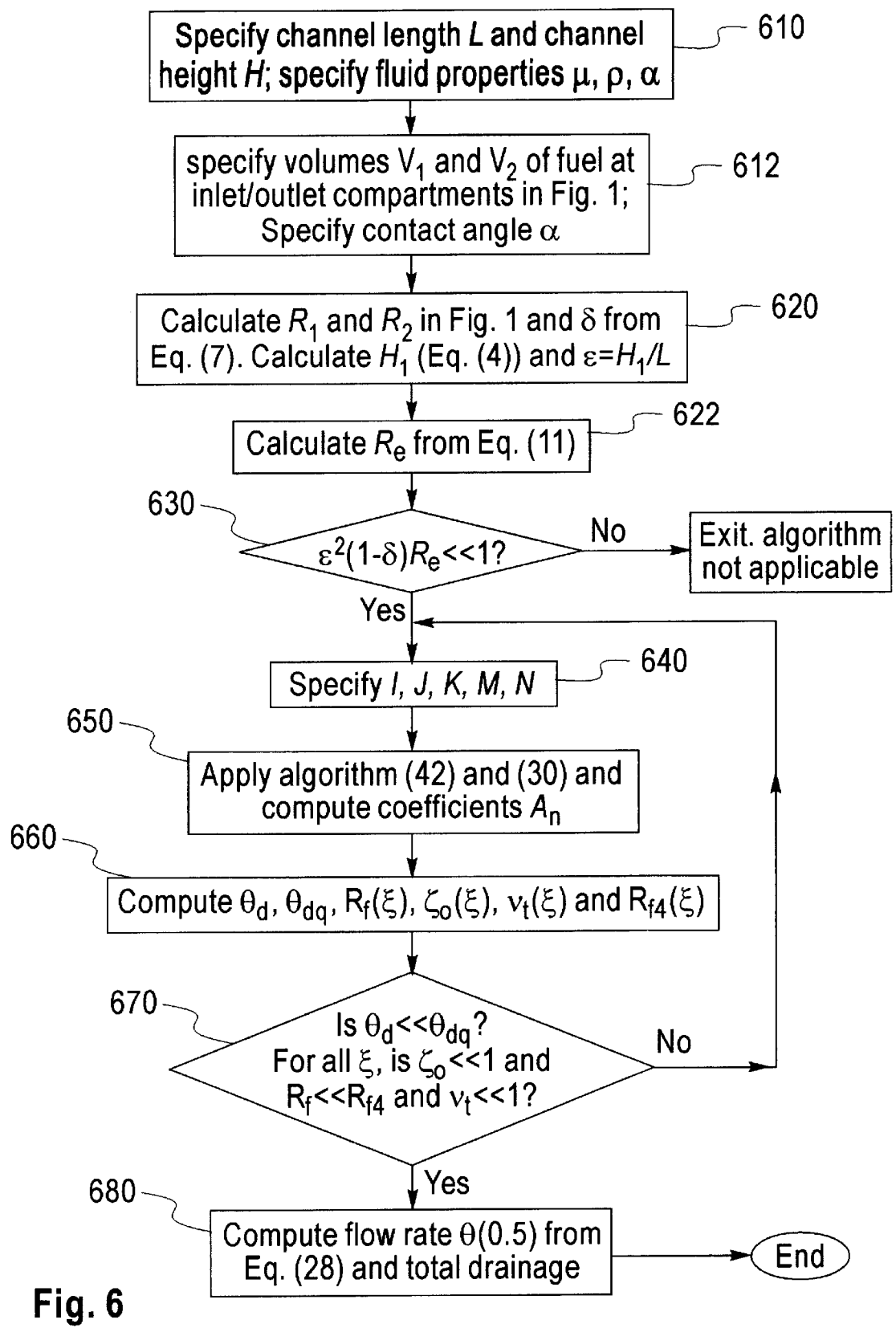
FIG. 6 is a flowchart of a procedure for calculating flow rate and drainage time in accordance with an embodiment of the invention.

FIG. 6 summarizes the entire procedure for calculation of the drainage time. In step 610, various channel parameters L, H and fluid properties $\mu$, $\rho$, $\sigma$ are specified. In the directly following step 612, the respective volumes $V_1$ and $V_2$ of the inlet and outlet compartments are specified, together with contact angle $\alpha$. From these specified parameters, $R_1$ and $R_2$ are calculated in FIG. 1, and $\delta$ is calculated from Eq. (7) in step 620. The value of $H_i$ and $\epsilon=H_i/L$ are also calculated in this step from Eq. (4). In next step 622, $R_e$ is calculated from Eq. (11). In the next step 630, it is determined whether $\epsilon^2(1-\delta)R_e<<1$. If not, the described algorithm is not completed as the assumptions made in the context of the modified set of equations do not apply well enough for the modified equations to provide an adequate representation of the open-channel geometry.

If the comparison of step 630 is valid, then the process proceeds in step 640 by specification of parameters I, K, J, L, M and N. In next step 650, algorithms of (42) and (30) are applied to calculate coefficients $A_n$. From the $A_n$, parameters $\Theta_d$, $\Theta_{dg}$, $R_f(\xi)$, $\zeta_0(\xi)$, $v_t(\xi)$ and $R_{fq}(\xi)$ can then be calculated in following step 660.

In the next step 670, it is determined whether $\Theta_d<<\Theta_{dq}$, and whether, for all $\xi$, is $\zeta_0<<1$ and $R_f<<R_{fq}$ and $v_t<<1$. If this is not the case, then the next step reverts to the alternate specification of parameters I, K, J, L, M and N in step 640, and the successive steps repeated until these conditions hold. When these conditions do hold, the flow rate $\Theta(0.5)$ is computed from Eq. (28) in step 680, with consequent calculation of total drainage time, thus completing the described process.

In Table 1 directly below shows the results of a simulation for $\alpha=0°$ and $\beta=2$. Here the notation aEb means $a\times 10^b$. In this table, $\alpha=0°$, $\beta=2$, N=6, J=60, K=30, I=10, M=100.

TABLE 1

| $\xi$ | $\Theta$ | $\Theta_q$ | $R_f$ | $R_{fq}$ | $\zeta_0$ | $v_t$ |
|---|---|---|---|---|---|---|
| 0 | 2.302E-4 | 4.181E-4 | 2.8E-4 | 0.048 | −1.8E-4 | 2.6E-4 |
| 1/9 | 2.302E-4 | 4.188E-4 | 1.9E-4 | 0.046 | −2.8E-5 | 2.8E-4 |
| 2/9 | 2.302E-4 | 4.184E-4 | 3.3E-4 | 0.045 | −1.3E-5 | 3.1E-4 |
| 1/3 | 2.302E-4 | 4.170E-4 | 8.5E-5 | 0.043 | 9.5E-6 | 3.2E-4 |
| 4/9 | 2.303E-4 | 4.147E-4 | 2.5E-4 | 0.041 | 2.8E-4 | 3.1E-4 |
| 5/9 | 2.302E-4 | 4.113E-4 | 1.7E-4 | 0.040 | −3.8E-4 | 4.6E-4 |
| 2/3 | 2.302E-4 | 4.069E-4 | 1.5E-4 | 0.038 | 3.9E-6 | 4.1E-4 |
| 7/9 | 2.303E-4 | 4.015E-4 | 1.3E-4 | 0.037 | 4.8E-4 | 2.8E-4 |
| 8/9 | 2.302E-4 | 3.951E-4 | 1.2E-4 | 0.035 | 4.4E-4 | 4.1E-4 |
| 1 | 2.301E-4 | 3.877E-4 | 1.3E-4 | 0.033 | −3.1E-4 | 2.0E-4 |

Note the excellent agreement of the computed flow rates at various stations in $\xi$ against the relatively poor agreement for the quadratic flow rates. Observe that the residuals in the free surface boundary condition have been reduced by two orders of magnitude as compared to the quadratic case. Importantly, $\zeta_0(\xi)$ does become vanishingly small for all practical purposes, thus guaranteeing the existence of the planar solution. These results are typically true of all runs. Table 2 directly below shows the values of the scaled coefficients $\tilde{A}_n(\xi)$ (see (41)) obtained for the run of the above table.

TABLE 2

| n | $\xi=0$ | $\xi=1/3$ | $\xi=2/3$ | $\xi=1$ |
|---|---|---|---|---|
| 1 | −0.703397 | −0.789624 | −0.888838 | −0.994018 |
| 2 | −7.741479 | −8.14264 | −8.60948 | −9.09258 |
| 3 | −11.04927 | −11.42175 | −11.71235 | −11.80866 |
| 4 | −13.62433 | −14.03890 | −13.36747 | −11.21748 |
| 5 | −10.60715 | −12.51492 | −12.72443 | −10.53379 |
| 6 | −1.71487 | −3.28314 | −4.10906 | −3.80639 |

Note that the coefficients $A_n$ are indeed slowly varying in $\xi$. In general, in order to obtain a converged result for some particular $A_n$, it would be required that N>>n; the other parameters such as I, M, J and K would also need to be suitably high. Table 3 directly below illustrates the convergence with respect to N of the flow rate $\Theta(5/9)$ and the first coefficient $\tilde{A}_1(5/9)$, for the same values of ($\alpha$, $\beta$, I, M) as in Table 1. In Table 3, $\alpha=0°$, $\beta=2$, I=10, M=100.

TABLE 3

| N | 4 | 5 | 6 | 7 | 8 |
|---|---|---|---|---|---|
| J | 60 | 60 | 60 | 60 | 65 |
| K | 30 | 30 | 30 | 30 | 32 |
| $R_f(5/9)$ | 1.4E-4 | 5.3E-5 | 1.7E-4 | 6.9E-5 | 1.2E-4 |
| $\zeta_0(5/9)$ | 7.9E-5 | 4.1E-5 | −3.8E-4 | −1.7E-4 | 8.4E-4 |
| $v_t(5/9)$ | 3.5E-5 | 1.4E-4 | 4.6E-4 | 2.0E-4 | 3.6E-4 |
| $\Theta(5/9)$ | 2.295E-4 | 2.282E-4 | 2.302E-4 | 2.231E-4 | 2.370E-4 |
| $\Theta_d$ | 1.3E-7 | 1.1E-7 | 1.4E-7 | 1.4E-7 | 4E-7 |
| $\tilde{A}_1(5/9)$ | −0.87084 | −0.89985 | −0.85442 | −0.86591 | −0.86058 |
| $\upsilon$ | 0.556 | 0.553 | 0.557 | 0.540 | 0.574 |

Note that the convergence is fairly satisfactory and that N=6, 7 produce the best results. In general, the number of Fourier modes (J and K) needs to be increased as N increases. The minimum number of modes required depends on the values of the coefficients $A_n$, and cannot be easily predicted a priori. Table 4 below lists the flow rate as I, J, K and M are varied in addition to N. The flow rate seems to have converged to within 5% error. In this case, $\alpha=0°$, $\beta=2$.

TABLE 4

| M | 25 | 100 | 100 | 200 |
|---|---|---|---|---|
| I | 5 | 10 | 20 | 5 |
| J | 30 | 40 | 60 | 120 |
| K | 15 | 20 | 30 | 60 |
| N | 5 | 4 | 6 | 5 |
| $v_t(0)$ | 2.7E-3 | 7.7E-4 | 3.2E-4 | 3.1E-5 |
| $\zeta_0(0)$ | 1.2E-3 | 2.7E-5 | 2.0E-4 | 2.1E-4 |
| $R_f(0)$ | 7.6E-4 | 6.3E-4 | 2.6E-4 | 8.5E-4 |
| $\Theta(0)$ | 2.465E-4 | 2.329E-4 | 2.413E-4 | 2.337E-4 |
| $\Theta_d$ | 9E-7 | 4.4E-7 | 2.4E-7 | 1.1E-6 |
| $\upsilon$ | 0.597 | 0.564 | 0.584 | 0.566 |

Finally, some results for other aspect ratios and contact angles are presented in Table 5 below.

TABLE 5

| N | 6 | 6 | 7 | 7 | 6 | 10 |
|---|---|---|---|---|---|---|
| J | 60 | 60 | 65 | 65 | 60 | 66 |
| K | 30 | 30 | 32 | 32 | 30 | 32 |
| $\alpha°$ | 30 | 30 | 0 | 0 | 15 | 60 |
| $\beta$ | 1 | 2 | 4 | 8 | 2 | 2 |
| M | 100 | 100 | 100 | 100 | 100 | 100 |

TABLE 5-continued

| I | 10 | 10 | 10 | 10 | 20 | 20 |
|---|---|---|---|---|---|---|
| $\Theta(0)$ | 1.028E-4 | 2.386E-4 | 5.572E-4 | 1.082E-3 | 2.312E-4 | 3.999E-4 |
| $\Theta_d$ | 1.4E-7 | 1E-7 | 1.1E-6 | 2.6E-6 | 2.2E-7 | 1.2E-6 |
| $\Theta_q(0.5)$ | 1.92E-4 | 5.62E-4 | 1.15E-3 | 2.63E-3 | 4.97E-4 | 6.6E-4 |
| $\Theta_{dq}$ | 8E-6 | 1.35E-4 | 2.92E-4 | 8.1E-4 | 8.96E-5 | 2.05E-4 |
| $R_t(0)$ | 2.2E-4 | 3.56E-4 | 1.47E-4 | 1.63E-3 | 6.4E-4 | 1.2E-3 |
| $\zeta_0(0)$ | -7.3E-3 | 1.9E-3 | -3.8E-4 | -5.5E-3 | -5.1E-4 | 1.4E-3 |
| $v_t(0)$ | 4.9E-6 | 1.7E-5 | 6.8E-4 | 2.9E-3 | 1.0E-4 | 3.9E-5 |
| $\upsilon$ | 0.535 | 0.424 | 0.485 | 0.411 | 0.465 | 0.606 |

Note that $\upsilon<1$ in all instances (refer also to the third and fourth tables) and for given $\alpha$, $\upsilon$ decreases as $\beta$ increases. These facts support the remarks made at the end of Sec. 4. An additional interesting phenomenon is worth pointing out. For $\beta=2$, as $\alpha$ is increased through (0°, 15°, 30°, 60°), it is found from the third and fifth tables that the respective values of $\upsilon$ are given by (0.557, 0.465, 0.424, 0.606). This behaviour of $\upsilon$ may be explained as follows. As the contact angle increases, the curvature of the free surface decreases and therefore by continuity, the dissipation due to cross-flow effects may be expected to decrease (in view of the slower variations in y and z). But as $\alpha$ increases, the total cross-section area increases and this factor tends to increase the dissipation due to cross flow because of the longer spiralling paths traced out by the fluid. Thus a minimum in $\upsilon$ is found at some positive valued $\alpha$ because of the influence of these two competing factors.

Finally, the criterion for validity of the stated results of this section, namely Eq. (39), was checked at the free surface with $\hat{p}$ replaced by $\hat{p}_3$ and found to be satisfactory in all cases except for a small layer near y=0 in some instances where the contact angle is zero. As noted above, it is expected that this effect is due to the asymmetry in the 3-D solution and may be substantially cancelled out when the contribution to the pressure from the planar solution is added. If this is not the case, then these reported results have to be re-scaled for smaller $\epsilon$ and/or larger $\delta$ (the numerics need not be repeated; see (40) for the required transformations when $\delta$ is increased). Here it should be kept in mind that the value of 0.7 for $\delta$ is probably too low in most practical situations. It can be expected the initial value of $\delta$ to be much closer to 1, say $\delta=0.97$, in which case (39) would be satisfied for all these results (when suitably re-scaled). In all instances of non-zero contact angle reported here (39) is satisfied throughout the domain with $\hat{p}$ replaced by $\hat{p}_3$.

Expressions for $P_n$, $Q_n$ and R

In the preceding analysis, the expressions for $P_n$, $Q_n$ and R are defined as follows:

Initially, define (using appropriate formulae in the main text and omitting functional dependencies; in particular, $f$ is defined in Eq. (9)).

$$K_{nj} \equiv \frac{J_{nj}}{\phi_n} - I_{nj}, \quad S_n \equiv \sinh\left[\frac{b\phi_n}{2}\right], \quad C_n \equiv \cosh\left[\frac{b\phi_n}{2}\right],$$

$$\Lambda_j \equiv \sum_{k=1}^{\infty} \frac{D_{kj}}{2k-1}\sin(\phi_k y), \quad L_n \equiv (-1)^n \sum_{j=1}^{\infty} jK_{nj}\Lambda_j\cos(\kappa_j f),$$

$$T_j \equiv \sum_{k=1}^{\infty} D_{kj}\cos(\phi_k y), \quad M_n \equiv (-1)^n \sum_{j=1}^{\infty} K_{nj}T_j\sin(\kappa_j f),$$

$$\beta_n \equiv \frac{(-1)^{n+1}}{2n-1}\sum_{j=1}^{\infty} jJ_{nj}\Lambda_j\cos(\kappa_j f),$$

$$\chi_n \equiv \frac{(-1)^{n+1}}{2n-1}\sum_{j=1}^{\infty} J_{nj}T_j\sin(\kappa_j f).$$

The formulae for $P_n$, $Q_n$ and R are given by:

$$P_n(\xi, y) = -\frac{y}{\phi_n}\sin(\phi_n y)\cosh(\phi_n f) - \frac{32\omega^2 y}{\pi b^2}\beta_n +$$
$$\frac{8\omega y(-1)^{n+1}}{(2n-1)b\pi}\sum_{j=1}^{\infty} J_{nj}\cos(\kappa_j f) - \frac{8\omega\chi_n\sqrt{\frac{\omega^2}{\cos^2\alpha} - y^2}}{b\pi} +$$
$$\frac{8(-1)^{n+1}\omega^2 y S_n}{b\pi^2(2n-1)^2},$$

$$\frac{Q_n(\xi, y)}{1-\delta} = \frac{y}{2\omega}\left[\left\{\frac{\sin(\phi_n y)}{\phi_n} - y\cos(\varphi_n y)\right\}\cosh(\phi_n f) - f\sin(\phi_n y)\sinh(\phi_n f)\right] - \frac{8yL_n}{b^2} +$$
$$\frac{2y}{b\omega}(-1)^n \sum_{j=1}^{\infty} [K_{nj}\cos(\kappa_j f)] - \frac{2M_n\sqrt{\frac{\omega^2}{\cos^2\alpha} - y^2}}{b\omega} +$$
$$\frac{(-1)^n y}{(2n-1)b\pi}\left[\frac{4S_n}{\phi_n} - bC_n\right] +$$
$$\frac{1}{2}\left[\omega - \tan\alpha\sqrt{\frac{\omega^2}{\cos^2\alpha} - y^2}\right]\cos(\phi_n y)\cosh(\phi_n f),$$

$$R(\xi, y) = (1-\delta)^2\lambda\cos\alpha\left\{\frac{y}{12}\left[1 - \frac{y^3}{\omega^3}\right] + \frac{(\omega^2 - y^2)}{8\omega^2}\left[\tan\alpha\sqrt{\frac{\omega^2}{\cos^2\alpha} - y^2} - \omega\right]\right\}.$$

Finite Difference Scheme

In the above, a finite difference scheme for numerical computation can be used as now described.

Consider five equally spaced points $x_i$, i=1,2, ..., 5, where the spacing is h. Let $g(x)$ be a function and denote $g_i=g(x_i)$, $g_i'=g'(x_i)$, where prime stands for derivative. The five point interpolation scheme leads to the following expression for the derivatives:

$$g_i' = \sum_{j=1}^{5} \frac{\Omega_{ij}g_j}{h},$$

where $\Omega_{ij}$ is specified by the entry in the $i^{th}$ row and $j^{th}$ column of the following matrix:

$$\Omega = \begin{bmatrix} -\frac{25}{12} & 4 & -3 & \frac{4}{3} & -\frac{1}{4} \\ -\frac{1}{4} & -\frac{5}{6} & \frac{3}{2} & -\frac{1}{2} & \frac{1}{12} \\ \frac{1}{12} & -\frac{2}{3} & 0 & \frac{2}{3} & -\frac{1}{12} \\ -\frac{1}{12} & \frac{1}{2} & -\frac{3}{2} & \frac{5}{6} & \frac{1}{4} \\ \frac{1}{4} & -\frac{4}{3} & 3 & -4 & \frac{25}{12} \end{bmatrix}$$

In this case, if $(\xi_i, i=1,2, \ldots, I)$ represents the uniform discretization in $\xi$ then the above scheme is used to determined $A'_n(\xi_i)$, $i \leq 5$; for $i>5$, the five points corresponding to $(\xi_j, j=i-4, i-3, \ldots, i)$ are used to determine $A'_n(\xi_i)$. The local truncation error in this scheme is easily shown to be $O([h(1-\delta)]^4)$, which is sufficiently small for present purposes. Note that the factor of $(1-\delta)^4$ is included because of the slow variation (in $\xi$) of the coefficients $A_n(\xi)$, as explained above.

Overview

The technique described above is now summarised in overview with reference to FIG. 6.

Initially, an open-channel geometry is specified in steps 610 and 612. This involves defining channel length L and height H, and respective volumes $V_1$ and $V_2$ of the fuel inlet and outlet compartments. Liquid properties $\mu$, $\rho$ and $\sigma$ are also defined, as well as contact angle $\alpha$ which depends on both the liquid and the material of the open-channel geometry.

Once the parameters of open-channel geometry and the fluid are appropriately specified, respective meniscus radii $R_1$ and $R_2$ at the inlet and outlet ends of the open-channel geometry are calculated in step 620. With reference to FIG. 4, the parameter $\delta$, which represents the degree of tapering is calculated from the meniscus radii $R_1$ and $R_2$ and average channel height H in accordance with equation (7). In terms of this modified geometry, the inlet and outlet heights $H_i$ and $H_o$ can be determined, as well as parameter $\epsilon$, which is $H_i/L$. The Reynolds number $R_e$ governing the liquid flow can now be calculated in step 622.

At this stage, a determination is made as to whether $\epsilon^2(1-\delta) R_e \ll 1$ in step 630. If such an assumption is not justified or appropriate, the described technique is not performed. Otherwise, further calculations are performed in steps 640, 650 and 660. In step 640, parameters of numerical calculation I, J, K, M, N are appropriately specified. Coefficients $A_n$ are then computed in step 650 by appropriate numerical methods in which $A_n$ are arbitrary functions of generalised flow rate. In this case, a least-squares algorithm is used.

In step 660 $\theta_d$ and $\theta_{dq}$ are calculated to check the appropriateness of the numerical solution.

Other terms $R_f(\xi)$, $\zeta_o(\xi)$, $V_t(\xi)$ are similarly calculated. In step 670, these parameters are checked to determine whether the calculated solution has appropriately converged, or whether the process should be repeated from step 640.

If the solution is determined to have converged, the flow rate is calculated in step 680 as the flow half way along the channel geometry, as $\theta(0.5)$. Total drainage time can consequently be calculated by appropriate integration.

Other variants of the described algorithm are possible. For example, still higher-order finite difference schemes can be considered and (38) could have a role to play for higher contact angles and/or aspect ratios. A problem of interest is to include the effects of small gravity as well in the present method. This is straightforward if gravity is in the flow direction. But if the gravity force is in any other direction, the symmetry of the calculated flows in y and z would be destroyed. In this case the method proposed is still applicable; the eigenfunctions and Fourier modes corresponding to other symmetries in y and z must also be included and boundary conditions on the full domain must be considered. The algebraic complications would increase considerably.

Computer Hardware

Figure 7:
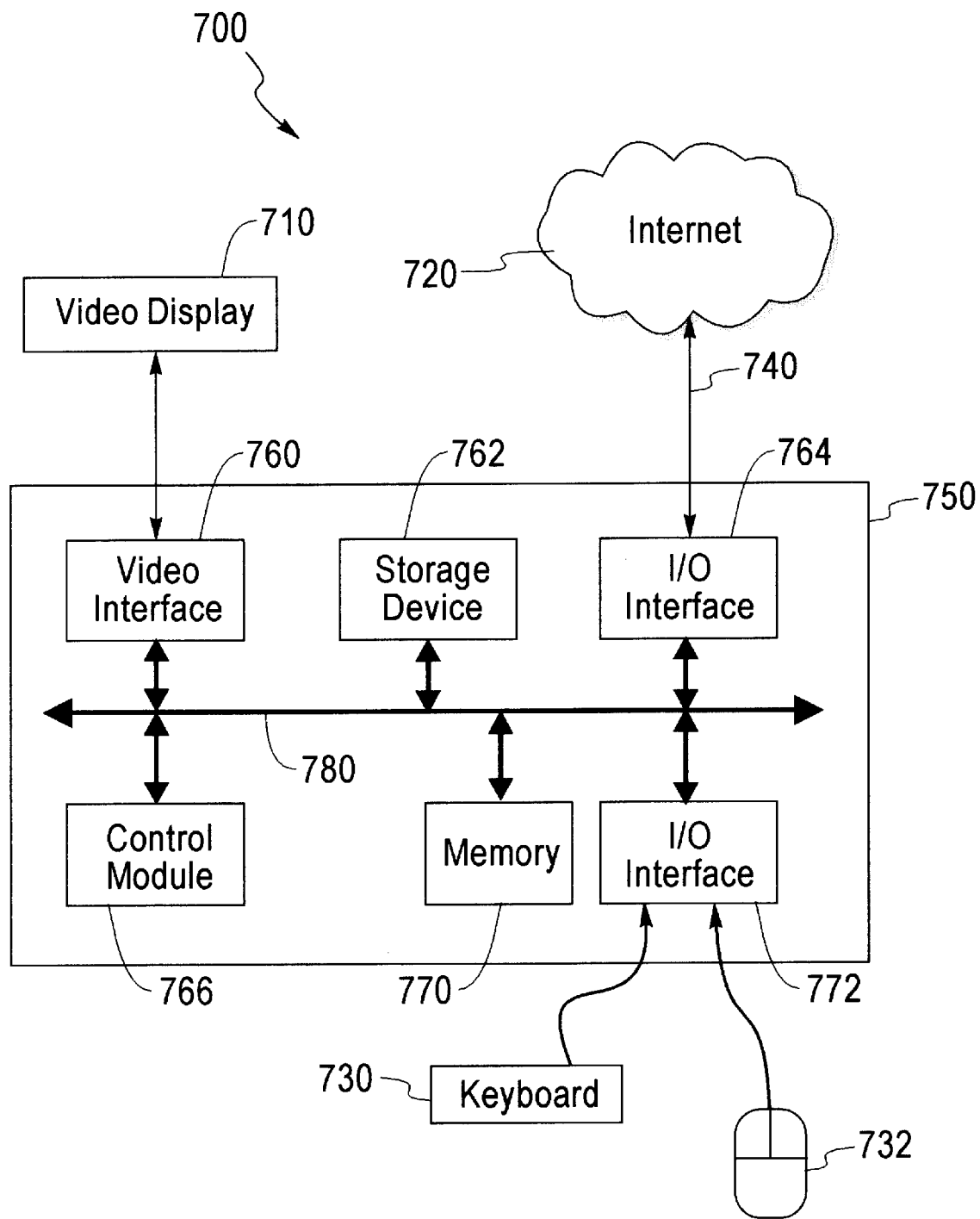
FIG. 7 is a schematic representation of computer hardware and associated equipment able to perform the calculation procedure of FIG. 6.

The above described process can be implemented using a computer program product in conjunction with a computer system 700 as shown in FIG. 7. In particular, the process can be implemented as software, or computer readable program code, executing on the computer system 700.

The computer system 700 includes a computer 750, a video display 710, and input devices 730, 732. In addition, the computer system 700 can have any of a number of other output devices including line printers, laser printers, plotters, and other reproduction devices connected to the computer 750. The computer system 700 can be connected to one or more other computers via a communication input/output (I/O) interface 764 using an appropriate communication channel 740 such as a modem communications path, an electronic network, or the like. The network may include a local area network (LAN), a wide area network (WAN), an Intranet, and/or the Internet 720.

The computer 750 includes the control module 766, a memory 770 that may include random access memory (RAM) and read-only memory (ROM), input/output (I/O) interfaces 764, 772, a video interface 760, and one or more storage devices generally represented by the storage device 762. The control module 766 is implemented using a central processing unit (CPU) that executes or runs a computer readable program code that performs a particular function or related set of functions.

The video interface 760 is connected to the video display 710 and provides video signals from the computer 750 for display on the video display 710. User input to operate the computer 750 can be provided by one or more of the input devices 730, 732 via the I/O interface 772. For example, a user of the computer 750 can use a keyboard as I/O interface 730 and/or a pointing device such as a mouse as I/O interface 732. The keyboard and the mouse provide input to the computer 750. The storage device 762 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 750 is typically connected to other devices via a bus 780 that in turn can consist of data, address, and control buses.

The method steps for are effected by instructions in the software that are carried out by the computer system 700. Again, the software may be implemented as one or more modules for implementing the method steps.

In particular, the software may be stored in a computer readable medium, including the storage device 762 or that is downloaded from a remote location via the interface 764 and communications channel 740 from the Internet 720 or another network location or site. The computer system 700 includes the computer readable medium having such software or program code recorded such that instructions of the software or the program code can be carried out. The use of the computer system 700 preferably effects advantageous apparatuses for calculating flow rates using a computer program operating in accordance with the embodiments of the invention.

The computer system 700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 766. Intermediate storage of the program code and any data including entities, tickets, and the like may be accomplished using the memory 770, possibly in concert with the storage device 762.

In some instances, the program may be supplied to the user encoded on a CD-ROM or a floppy disk (both generally depicted by the storage device 762), or alternatively could be read by the user from the network via a modem device connected to the computer 750. Still further, the computer system 700 can load the software from other computer readable media. This may include magnetic tape, a ROM or integrated circuit, a magneto-optical disk, a radio or infrared transmission channel between the computer and another device, a computer readable card such as a PCMCIA card, and the Internet 720 and Intranets including email transmissions and information recorded on Internet sites and the like. The foregoing are merely examples of relevant computer readable media. Other computer readable media may be practised without departing from the scope and spirit of the invention.

Further to the above, the described methods can be realised in a centralised fashion in one computer system 700, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

Conclusion

Other variants of the described algorithm are possible. For example, one could consider still higher-order finite difference schemes and (38) could have a role to play for higher contact angles and/or aspect ratios. A problem of interest is to include the effects of small gravity as well in the present method. This is straightforward if gravity is in the flow direction. But if the gravity force is in any other direction, the symmetry of the calculated flows in y and z would be destroyed. In this case the proposed method is still applicable; the eigenfunctions and Fourier modes corresponding to other symmetries in y and z must also be included and boundary conditions on the fill domain must be considered. The algebraic complications would increase considerably.

The techniques described are more broadly applicable to other applications besides propellant fuel flow through propellant management devices. In particular, the described embodiment is directly applicable to problems which involve estimating transfer flow rates for any liquid by capillary pumping in zero-gravity conditions (that is, in "space"). This may arise in the context of satellites, as described, or in relation to the delivery of liquid fuels in spacecraft from fuel tank to the spacecraft's thrusters or to the fuel tank of another space vehicle.

It is understood that the invention is not limited to the embodiment described, but that various alterations and modifications, as would be apparent to one skilled in the art, are included within the scope of the invention.

I claim:

1. A method of estimating the flow rate of a liquid through an open-channel geometry, the method comprising steps of:
   defining (i) an open-channel geometry having an inlet end and an outlet end, between which there is a capillary passage having two parallel walls, (ii) a set of parameters associated with the open-channel geometry, and (iii) analytical equations involving the set of parameters which govern the flow of liquid through the open-channel geometry; and
   deriving a modified set of analytic equations corresponding to the governing analytic equations of the open-channel geometry, and solving said modified set of analytic equations to calculate a representative flow rate defined by the modified set of equations;
   wherein said modified set of equations are derived from a modified open-channel geometry based on an artificial assumption that an elongate dimension of the open-channel geometry is tapered, so that the representative flow rate can be calculated as an approximation of the flow rate in the open-channel geometry.

2. The method as claimed in claim 1, wherein the parameters associated with the open-channel geometry include: length L, height H, and width B oriented along respective orthogonal axes X, Y and Z.

3. The method as claimed in claim 2, wherein the parameters associated with the open-channel geometry include: inlet compartment volume $V_1$ and outlet compartment volume $V_2$ associated with respective inlet and outlet compartments.

4. The method as claimed in claim 3, wherein the parameters associated with the open-channel geometry include: liquid viscosity $\mu$, surface tension coefficient $\sigma$ and contact angle $\alpha$ between the liquid with the open-channel geometry.

5. The method as claimed in claim 4, wherein the parameters associated with the open-channel geometry include: inlet liquid pressure $P_1$, outlet liquid pressure $P_2$ and ambient pressure $P_0$.

6. The method as claimed in claim 5, wherein the pressure drop across the length L of the open-channel geometry is assumed to be $P_1-P_2$ by neglecting the pressure drops across the inlet and outlet compartments in the modified set of equations.

7. A method as claimed in claim 6, wherein the calculated meniscus radii of curvature $R_i$ and $R_o$ of the liquid at the inlet and outlet ends of the open-channel geometry is assumed to be independent of the inlet or outlet end geometry, in the modified set of equations.

8. The method as claimed in claim 6, wherein the meniscus radii of curvature $R_1$ and $R_2$ at the inlet and outlet compartments of the open-channel geometry is calculated using the contact angle $\alpha$ and the inlet and outlet compartment volumes $V_1$ and $V_2$.

9. The method as claimed in claim 7, wherein the instantaneous pressure difference $P_1-P_2$ is determined from the Laplace-Young equation from the respective inlet and outlet meniscus radii $R_1$ and $R_2$, and the surface tension coefficient $\sigma$.

10. The method as claimed in claim 1, wherein the representative flow rate is assumed to be independent of the geometries at the inlet and outlet ends, in the modified set of equations.

11. The method as claimed in claim 5, wherein the representative flow rate is calculated for a section L* of the length L over which the flow through the open-channel geometry is assumed to be independent of the geometries of the inlet and outlet ends, in the modified set of equations.

12. The method as claimed in claim 11, wherein the section L* is assumed to be approximated by the length L, in the modified set of equations.

13. The method as claimed in claim 12, wherein the ratios of height H to the respective lengths between the ends of length L and the ends of section L* (namely H/$X_i$ and H/(L −$X_o$)) are assumed to be vanishingly small, so that these terms can be disregarded in the modified set of equations.

14. The method as claimed in claim 12, wherein the ratio of height H to length L is assumed to be vanishingly small, so that this term can be disregarded in the modified set of equations.

15. The method as claimed in claim 12, wherein time derivatives are assumed to be vanishingly small such that flow rate is directly related to the instantaneous pressure difference between the inlet end and the outlet end, in the modified set of equations.

16. The method as claimed in claim 1, wherein the taper of the open-channel geometry is assumed to be linear to a first order approximation.

17. The method as claimed in claim 16, wherein the artificial assumption of a tapered height obviates the need to take into account the calculation of wall layers in the open-channel geometry for the analytic governing equations, so that the free surface of the liquid has approximately a constant radius of curvature, which is able to satisfy requirements of the contact angle α.

18. The method as claimed in claim 4, wherein the artificial assumption that a dimension of the open-channel geometry is tapered is made in the modified set of equations so that the modified set of equations can be solved when derived on the assumption that the radius of curvature R of the free surface of the liquid can be calculated as:

$$R = \frac{H}{2\cos\alpha}$$

19. The method as claimed in claim 1, wherein said modified set of equations are derived on the assumption that the free surface of the liquid of the inlet and/or outlet is nearly circular, except for small deviations which maintain the contact angle between the liquid and the open-channel geometry.

20. The method as claimed in claim 5, wherein a parameter δ defines a linear taper in average height H, such that the inlet and outlet heights $H_i$ and $H_o$ are given by:

$$H_i = \frac{2H}{1+\delta}, \quad H_o = \frac{2\delta H}{1+\delta} = \delta H_i.$$

21. The method as claimed in claim 20, wherein the parameter δ is in the range (0, 1].

22. The method as claimed in claim 21, wherein the differing radii of curvature $R_i$ and $R_o$ of the free surface at the inlet and outlet ends of the modified open-channel geometry can be respectively calculated while maintaining the relationship between the contact angle α and the heights $H_i$ and $H_o$ at the inlet end and outlet end.

23. The method as claimed in claim 22, wherein the pressure difference across the length L of the modified open-channel geometry is assumed to be $P_i$−$P_o$ by neglecting the velocity of the liquid through the open-channel geometry.

24. The method as claimed in claim 23, wherein the pressure drop across the open-channel geometry is equated with the pressure drop across the modified open-channel geometry to determine the parameter δ.

25. The method as claimed in claim 24, wherein the parameter δ is sufficiently close to 1 that the representative flow rate deviates from the flow rate in the open-channel geometry primarily in respect of small layers of liquid flow near the walls of the open-channel geometry.

26. The method as claimed in claim 1, wherein the modified open-channel geometry is represented in the modified set of equations in non-dimensional form.

27. The method as claimed in claim 1, wherein the Reynolds number associated with the liquid flow is assumed to be sufficiently small that inertial effects can be disregarded, in the modified set of equations.

28. The method as claimed in claim 1, wherein an upper bound to the flow rate in the open-channel geometry can be determined using the modified set of equations in which cross-flow dissipation of the liquid flow through the open-channel geometry is assumed to be zero.

29. The method as claimed in claim 1, wherein the modified set of equations are solved with a finite difference scheme using a weighted least-squares algorithm.

30. The method as claimed in claim 1, wherein the parallel walls of the open-channel geometry represent a fuel tank wall and a vane in a propellant management device for delivering liquid fuel.

31. An apparatus for estimating the flow rate of a liquid through an open-channel geometry, the apparatus comprising:

means for defining (i) an open-channel geometry having an inlet end and an outlet end, between which there is a capillary passage having two parallel walls, (ii) a set of parameters associated with the open-channel geometry, and (iii) analytical equations involving the set of parameters which govern the flow of liquid through the open-channel geometry; and means for deriving a modified set of analytic equations corresponding to the governing analytic equations of the open-channel geometry, and solving said modified set of analytic equations to calculate a representative flow rate defined by the modified set of equations;

wherein said modified set of equations are derived from a modified open-channel geometry based on an artificial assumption that an elongate dimension of the open-channel geometry is tapered, so that the representative flow rate can be calculated as an approximation of the flow rate in the open-channel geometry.

32. A computer program product having a computer readable medium having a computer program recorded therein for estimating the flow rate of a liquid through an open-channel geometry, said computer program comprising:

code means for recording a definition of (i) an open-channel geometry having an inlet end and an outlet end, between which there is a capillary passage having two parallel walls, (ii) a set of parameters associated with the open-channel geometry, and (iii) analytical equations involving the set of parameters which govern the flow of liquid through the open-channel geometry; and code means for storing a modified set of analytic equations corresponding to the governing analytic equations of the open-channel geometry, and solving said modified set of analytic equations to calculate a representative flow rate defined by the modified set of equations;

wherein said modified set of equations are derived from a modified open-channel geometry based on an artificial assumption that an elongate dimension of the open-channel geometry is tapered, so that the representative flow rate can be calculated as an approximation of the flow rate in the open-channel geometry.

* * * * *